(12) United States Patent
Taniguchi

(10) Patent No.: US 12,547,185 B2
(45) Date of Patent: Feb. 10, 2026

(54) AUTONOMOUS DRIVING VEHICLE OPERATION SYSTEM

(71) Applicant: ROBO-HI Corporation, Tokyo (JP)

(72) Inventor: Eko Taniguchi, Tokyo (JP)

(73) Assignee: ROBO-HI CORPORATION, Tokyo (JP)

( * ) Notice: Subject to any disclaimer, the term of this patent is extended or adjusted under 35 U.S.C. 154(b) by 61 days.

(21) Appl. No.: 18/558,678

(22) PCT Filed: Oct. 28, 2022

(86) PCT No.: PCT/JP2022/040566
§ 371 (c)(1),
(2) Date: Nov. 2, 2023

(87) PCT Pub. No.: WO2023/085136
PCT Pub. Date: May 19, 2023

(65) Prior Publication Data
US 2024/0231387 A1 Jul. 11, 2024

(30) Foreign Application Priority Data
Nov. 10, 2021 (JP) .................................. 2021-183758

(51) Int. Cl.
*G05D 1/646* (2024.01)
*B66B 1/34* (2006.01)
(Continued)

(52) U.S. Cl.
CPC .......... *G05D 1/646* (2024.01); *B66B 1/3461* (2013.01); *B66B 1/468* (2013.01); *B66B 3/002* (2013.01);
(Continued)

(58) Field of Classification Search
CPC .......... G05D 1/646; G05D 1/221; G05D 1/69; G05D 1/246; G05D 2105/70;
(Continued)

(56) References Cited

U.S. PATENT DOCUMENTS 8,577,498 B2 * 11/2013 Kawano .................. B25J 9/1664
700/250
8,958,910 B2 * 2/2015 Ichinose ............... B66B 1/2458
700/258
(Continued)

FOREIGN PATENT DOCUMENTS

JP 2006089262 A 4/2006
JP 2009001425 A 1/2009
(Continued)

OTHER PUBLICATIONS

International Search report PCT/JP2022/040566 dated Dec. 27, 2022 (pp. 1-3).
(Continued)

*Primary Examiner* — Yazan A Soofi
(74) *Attorney, Agent, or Firm* — Miki Motohashi Iino; Millen, White, Zelano & Branigan, P.C.

(57) ABSTRACT

An operation system performs autonomous operation by using an operation server for an autonomous driving vehicle. The operation server includes a memory unit containing three-dimensional map data. An autonomous driving vehicle connects to the operation server via a wireless network. A vehicle control unit creates a traveling route based on the map data received, and when an elevator of a building is to be used, creates elevator usage information and elevator control information, including the boarding and exiting floors. The elevator is equipped with an elevator control unit that is connected to the operation server to control ascending and descending of an elevator cage. A control unit of the autonomous driving vehicle transmits the elevator usage
(Continued)

information and the elevator control information to the elevator control unit. The elevator control unit gives a voice announcement from a voice output unit in the elevator cage.

19 Claims, 10 Drawing Sheets

(51) Int. Cl.
*B66B 1/46* (2006.01)
*B66B 3/00* (2006.01)
*G05D 1/221* (2024.01)
*G05D 1/246* (2024.01)
*G05D 1/69* (2024.01)
*G05D 105/70* (2024.01)
*G05D 107/60* (2024.01)
*G05D 111/30* (2024.01)

(52) U.S. Cl.
CPC ............ *G05D 1/221* (2024.01); *G05D 1/246* (2024.01); *G05D 1/69* (2024.01); *B66B 2201/4638* (2013.01); *B66B 2201/4653* (2013.01); *G05D 2105/70* (2024.01); *G05D 2107/60* (2024.01); *G05D 2111/32* (2024.01)

(58) Field of Classification Search
CPC ............ G05D 2107/60; G05D 2111/32; B66B 1/3461; B66B 1/468; B66B 3/002

USPC .......................................................... 701/25
See application file for complete search history.

(56) References Cited

U.S. PATENT DOCUMENTS

| | | | |
|---|---|---|---|
| 11,897,727 B2 | 2/2024 | Koba et al. | |
| 2019/0218060 A1* | 7/2019 | Koba | ........................ G05D 1/43 |
| 2021/0114225 A1* | 4/2021 | Fukunaga | ............ G05D 1/0248 |
| 2023/0418296 A1* | 12/2023 | Ota | ........................ G05D 1/693 |

FOREIGN PATENT DOCUMENTS

| | | |
|---|---|---|
| JP | 2012017184 A | 1/2012 |
| JP | 2021064233 A | 4/2021 |
| WO | 2018066054 A1 | 4/2018 |
| WO | 2020217739 A1 | 10/2020 |

OTHER PUBLICATIONS

Korean Intellectual Property Office Notice of Non-Final Rejection dated May 30, 2025 issued in corresponding application 10-2023-7042803.

* cited by examiner

AUTONOMOUS DRIVING VEHICLE OPERATION SYSTEM

TECHNICAL FIELD

The present invention relates to an autonomous driving vehicle operation system that makes an autonomous driving vehicle travel along a predetermined traveling rout and reach the destination by referring to a map data.

BACKGROUND ART

As such an autonomous driving vehicle operation system, Patent Literature 1 discloses, in addition to a delivery system and a program, an autonomous driving vehicle that travels along a predetermined route, the vehicle including a left-and-right pair of display units provided on the front face of the main body and monitoring cameras for shooting the front, sides, and rear of the autonomous driving vehicle, wherein, by displaying given eye-shaped images on the display unit based on the state of the autonomous driving vehicle and/or the images shot by the monitoring camera, the eye-shaped images are made to change according to situations of obstacles, thereby making the vehicle be friendly to people around shops, delivery destination, and along the traveling route. Since this autonomous driving vehicle can communicate with pedestrians, etc. around, smooth driving is expected.

It is also known that by providing an autonomous driving vehicle with a voice output unit to output information related to the driving condition of the autonomous driving vehicle such as traveling direction during traveling as voice output, the traveling state of the autonomous driving vehicle can be notified.

With another known autonomous driving vehicle operation system, to make the autonomous driving vehicle use internal passages and elevators within buildings, for example, the map data including such internal passages and elevators is provided in advance for the autonomous driving vehicle to use them by referring to this map data. In this case, to let the pedestrians on the internal passages or the users of elevators be aware of the presence and driving state of the autonomous driving vehicle, giving voice output from the voice output unit of the autonomous driving vehicle has already been in practical use. Also known is an autonomous driving vehicle that adopts a system where markers are provided to road surfaces/wall surfaces to make the vehicle travel along the markers (Patent Literature 2).

CITATION LIST

Patent Literature

Patent Literature 1: International application WO 2020/145189 A1
Patent Literature 2: Republished patent JP WO 2020/013337 A1

Riding capacity is set for elevators. When the autonomous driving vehicle tries to use an elevator, and if the elevator cage is crowded, the space for the autonomous driving vehicle cannot be secured, and so the autonomous driving vehicle must refrain from taking the elevator. In such a case, if the people in the elevator cage are aware of the boarding of the autonomous driving vehicle in advance or when they take the elevator, they can move over to allow space for the autonomous driving vehicle, thus ensuring smooth boarding of the autonomous driving vehicle and shortening of boarding/exiting time. Also, it would be possible for the people who are already in the elevator cage to move over or change positions within the elevator cage, considering their exiting floor, if they know the boarding floor of the autonomous driving vehicle in advance.

SUMMARY OF INVENTION

Problem to be Solved by the Invention

As described above, the technology to give voice output of the information on the use of the elevator by an autonomous driving vehicle from the voice output unit of the autonomous driving vehicle has been in practical use. However, people already on the elevator cage cannot tell on which floor the autonomous driving vehicle is to get in, or on which floor the autonomous driving vehicle that is on the elevator cage is to get off. Also, when there are many people around the autonomous driving vehicle and they are talking out loud, or when relatively large noises exist around the autonomous driving vehicle, the announcement given by voice output from the voice output unit of the autonomous driving vehicle may not be heard clearly, and so the use of the elevator by the autonomous driving vehicle may not be recognized fully.

The objective of the present invention is to provide an autonomous driving vehicle operation system in a simple structure that can notify of the use of an elevator by the autonomous driving vehicle without fail so that elevator users who are already in the elevator cage or waiting for the arrival of the elevator in an elevator hall can recognize the use of the elevator by the autonomous driving vehicle in advance.

Means for Solving the Problem

The present invention provides an autonomous driving vehicle operation system comprising; an operation server for an autonomous driving vehicle, the operation server being equipped with a memory unit that registers three-dimensional map data on routes, surrounding environment, and buildings having elevators, for making the autonomous driving vehicle connected to the operation server via a wireless network drive autonomously along a predetermined traveling route from the current position to a destination based on map data received from the operation server, wherein the autonomous driving vehicle comprises: a traveling unit; a drive unit; a control unit; a detection unit including an image shooting unit, a posture detection sensor, and a position sensor, and a transmitting/receiving unit connected to a wireless network; the control unit of the autonomous driving vehicle recognizes the current position and surrounding environment based on detection signals from the detection unit, creates a traveling route from the current position to the destination by receiving map data of an area related to the move from the current position to the destination from the operation server, and controls the drive unit so as to drive the traveling unit along the traveling route; when the autonomous driving vehicle uses an elevator of a building along the traveling route, the control unit of the autonomous driving vehicle creates elevator usage information including calling of the boarding and exiting floors of the elevator and elevator control information including calling of the elevator cage on the boarding floor and designation of the exiting floor; the elevator of the building has an elevator control unit connected to the operation server via the wireless network for controlling the ascending/ descending of the elevator cage based on the elevator usage information and the elevator control information from the autonomous driving vehicle, the control unit of the autonomous driving vehicle transmits the elevator usage information and the elevator control information to the elevator control unit via the wireless network, and the elevator control unit outputs a voice announcement regarding the use of the elevator by the autonomous driving vehicle from the voice output unit installed in the elevator cage based on the elevator usage information.

Preferably, the autonomous driving vehicle further comprises a voice output unit, and the control unit of the autonomous driving vehicle outputs voice announcement informing of the traveling of the autonomous driving vehicle according to the movement along the traveling route from the voice output unit, and also outputs a voice announcement concerning the use of elevator from the voice output unit of the autonomous driving vehicle based on the elevator usage information.

Preferably, the operation server remotely monitors and/or remotely operates the operation of the autonomous driving vehicle based on the mutual position between autonomous driving vehicles or between the autonomous driving vehicle and surrounding environment, etc. based on the current position and traveling route of the autonomous driving vehicle, and the elevator control unit is controlled by the operation server.

Buildings preferably is equipped with a control server for controlling the entire buildings, and the control server is controlled by the operation server, and the control server controls the elevator control unit based on the elevator usage information and the elevator control information as results of the operation server.

The elevator control unit preferably outputs a voice announcement from a voice output unit installed in the elevator cage, informing of the boarding of the autonomous driving vehicle from the boarding floor to the exiting floor, based on the elevator usage information, during the period from before boarding to exiting of the autonomous driving vehicle into/from the elevator.

The elevator control unit is preferably comprising a voice output unit in an elevator hall on each floor of the elevator, and the elevator control unit outputs a voice announcement concerning the use of elevator by the autonomous driving vehicle from the voice output unit in the elevator hall provided on the boarding floor or the exiting floor. Preferably, the elevator cage has a display, and the elevator control unit provides images concerning the use of elevator by the autonomous driving vehicle on the display based on the elevator usage information. It is also possible that the elevator cage has an elevator analysis sensor, and the passenger information of the elevator cage obtained by the elevator analysis sensor is transmitted to the control unit of the autonomous driving vehicle via the elevator control unit and the elevator usage information and elevator control information are created based on the passenger information. The elevator analysis sensor comprises a camera or a LIDAR capable of measuring distances, a computer for processing image signals obtained by the camera or the LiDAR, and a memory unit, and a passenger information of the elevator cage obtained by the elevator analysis sensor is transmitted to the control unit of the autonomous driving vehicle via the elevator control unit and the operation server, and the elevator usage information and the elevator control information are created based on the passenger information.

If a display is provided in the proximity to the elevator hall, the operation server and/or the elevator control unit outputs images concerning the use of the elevator by the autonomous driving vehicle on the display, together with the voice output from the voice output unit of the elevator hall provided on the boarding or exiting floor, based on the elevator usage information.

The operation server preferably comprises an analysis unit for analyzing statistical elevator usage information transmitted from the elevator control unit, and a traveling route creation unit for creating a traveling route of the autonomous driving vehicle based on in-house probability information obtained by analyzing the statistical elevator usage information.

The elevator cage preferably comprises an elevator analysis sensor, and the analysis unit creates a traveling route of the autonomous driving vehicle based on the statistical elevator usage information and/or the passenger information output from the elevator analysis sensor.

The operation server preferably comprises a control unit for controlling a plurality of the autonomous driving vehicles, a cooperation unit for establishing communication between the plurality of autonomous driving vehicles and a plurality of the elevators, an analysis unit, a traveling control unit for controlling the traveling of the plurality of autonomous driving vehicles, a remote monitoring unit and/or remote operating unit for remotely monitoring and/or remotely operating the plurality of autonomous driving vehicles, a database for connection, database for analysis, database for traveling control, and database for remote monitoring and/or remote operation stored in the memory unit, wherein the control unit connects the plurality of autonomous driving vehicles to the plurality of elevators by the cooperation unit;

the traveling control unit creates elevator usage information pertaining to the plurality of elevators according to the schedule of the plurality of autonomous driving vehicles, and the operating state of the plurality of autonomous driving vehicles and that of the plurality of elevators are remotely monitored and/or remotely operated by the remote monitoring unit and/or the remote operating unit.

In addition, the autonomous driving vehicle is a passenger vehicle for transporting users such as elderly people, sick and injured people, and physically challenged individuals, a working vehicle for performing various operations such as cleaning, disinfection and monitoring, or an autonomous delivery vehicle for delivering various goods such as food, drink, and commodities.

Effects of Invention

The present invention provides the autonomous driving vehicle operation system in a simple structure capable of notifying the use of the elevator by the autonomous driving vehicle without fail.

BRIEF DESCRIPTION OF DRAWINGS

FIG. 2A is a front perspective view and FIG. 2B is a rear perspective view.

EMBODIMENTS OF THE INVENTION

First Embodiment

The present invention will hereinafter be described in detail based on several embodiments shown in the Figures. Please note that each embodiment is intended only to describe the present invention, and that the present invention is not limited to those. In the example shown, the autonomous driving vehicle is described as a minivan-type autonomous delivery vehicle for transporting ordered food and drink as well as purchased goods, but the shape and structure of the vehicle are not limited to this type of vehicle as far as the vehicle can get into a building or an elevator. Regarding applications, the system can also be applicable not only to goods delivery vehicles but also to autonomous passenger vehicles for transporting users such as elderly people, sick and injured people, and physically challenged individuals, or to various autonomous working vehicles that perform cleaning, disinfection, monitoring, etc. Buildings equipped with elevators may be not only office buildings and commercial facilities but also high-rise housing complex buildings.

Figure 1:
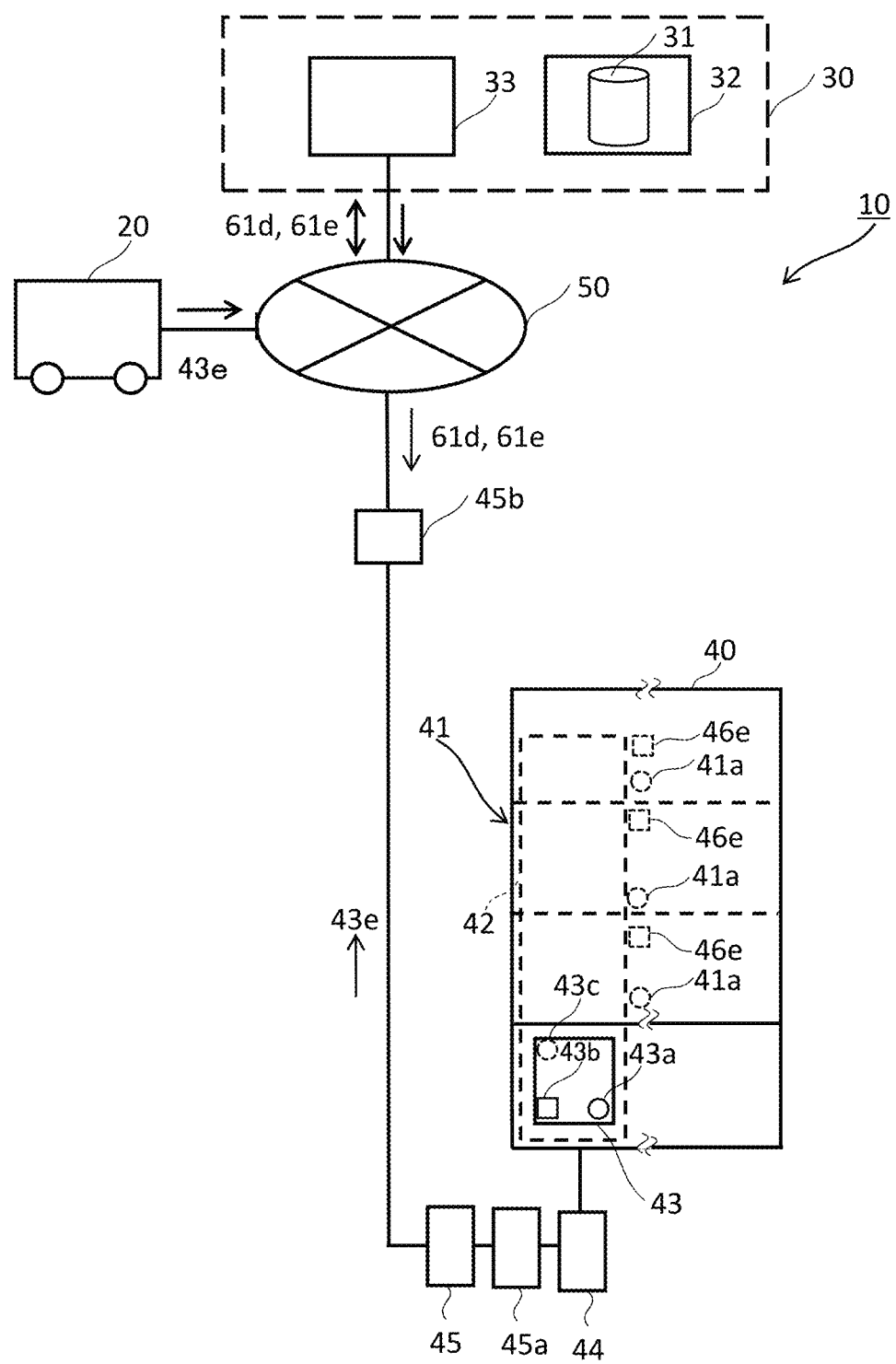
FIG. 1 is a block diagram showing the structure of a first embodiment of the autonomous driving vehicle operation system according to the present invention.

FIG. 1 shows the entire structure of a first embodiment of an autonomous driving vehicle operation system according to the present invention (hereinafter the operation system). The operation system 10 includes an autonomous driving vehicle 20, a server 30, a building 40, and a wireless network 50. The wireless network 50 is of an arbitrary composition, and may be a dedicated line network, public line network, or wireless LAN such as Wi-Fi.

Figure 2A:
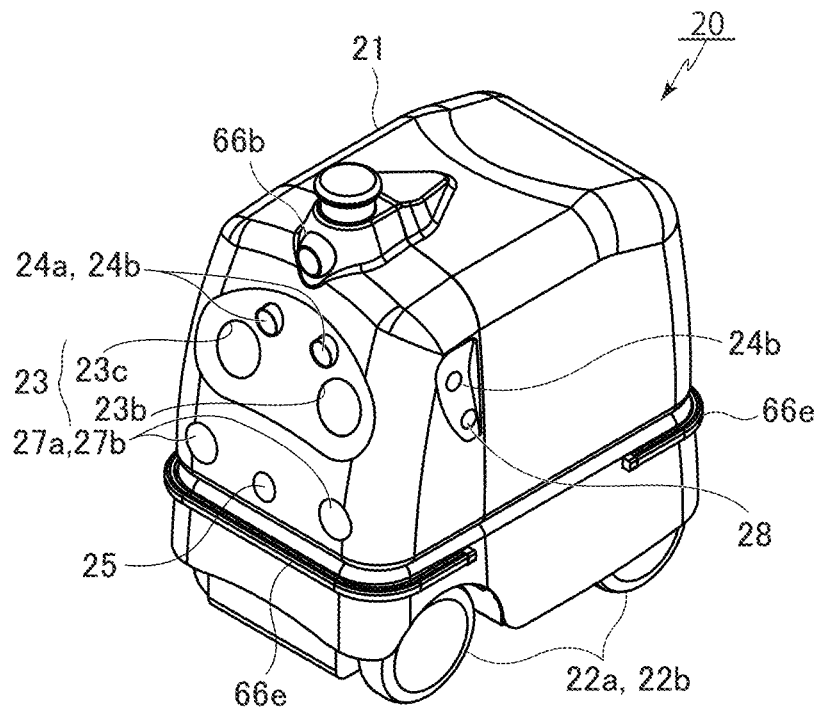
FIGS. 2A and 2B show the external structure of the autonomous driving vehicle in FIG. 1, where

As shown in FIG. 2, the autonomous driving vehicle 20 includes a main body 21 formed in an approximately cubic shape in appearance, and wheels 22 mounted to both sides of the main body 21. The main body 21 of the autonomous driving vehicle 20 is equipped with a display unit 23, monitoring cameras 24, a speaker 25 as a first voice output unit, a housing unit 26 for goods, lights 27, and direction indicators 28. As the lights 27, front lights 27a, 27b and rear lights 27c, 27d are respectively installed on the front side and the rear side of the autonomous driving vehicle 20. The autonomous driving vehicle shown, which has a housing unit 26 for goods, is intended to deliver various goods such as food, drink, and commodities. If the autonomous driving vehicle 20 is a working vehicle for performing various operations such as cleaning, disinfection, and monitoring, various functions are provided such as a polisher, cleaner, disinfectant sprayer, and security alarm depending on applications. When the autonomous driving vehicle 20 is of a cart type having a single seat, it can be used to transport users such as an elderly people, sick or an injured people, physically challenged individuals, etc. as an autonomous passenger vehicle. The autonomous driving vehicle 20 will be described below as a goods delivery vehicle driving along a traveling route that includes sidewalks, corridors within the building 40, and elevators to be described later, etc.

The direction indicators 28 in the shape of ears are arranged on front right and front left sides of the autonomous driving vehicle 20 so that the direction in which the vehicle is about to turn can be recognized by the people around the autonomous driving vehicle 20 from the front, side, and rear faces. They are lamps made of light-emitting diodes (LED), for example. The display unit 23 as a first image output unit is arranged on the front side of the main body 21, and displays eye-shaped images, which will be described later. The display unit 23 includes a display 63, which will be described later, and a right-and-left pair of openings 23a, 23b arranged on the front side of the main body 21. The display 63 is preferably a display unit using liquid crystal or light-emitting diode. A full-color light-emitting diode display with densely arranged high-brightness light-emitting diodes is more preferable. Under the display unit 23, a speaker 25 is installed.

Figure 2B:
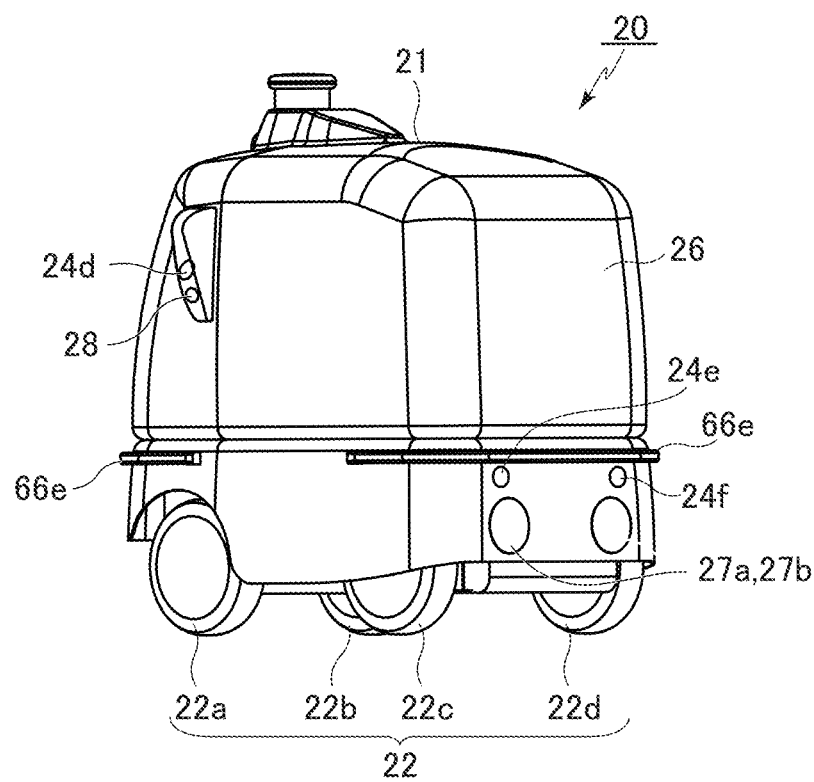

The monitoring cameras 24 shoot images around the autonomous driving vehicle 20, namely road conditions, pedestrians, etc. on the front, sides, and rear of the autonomous driving vehicle 20 to monitor them. The monitoring cameras 24 include a pair of front monitoring cameras 24a, 24b arranged on left-and-right sides at the front of the main body 21, and a pair of side monitoring cameras 24c, 24d arranged on left-and-right sides of the main body 21. As the monitoring cameras 24, monocular cameras, side-area cameras, stereo cameras, etc. can be used. As shown in FIG. 2, the monitoring cameras 24 may include a left-and-right pair of rear monitoring cameras 24e, 24f at the rear of the main body 21. If monocular cameras are used for each of the front monitoring cameras 24a, 24b and rear monitoring cameras 24e, 24f, 360-degree images showing pedestrians, people on bicycles, motorcycles, and cars, etc. around the autonomous driving vehicle 20 can be obtained to monitor surrounding areas. As shown in FIG. 2(B), on the rear of the main body 21, a housing unit 26, which is loaded with goods to be delivered, is provided.

Figure 3:
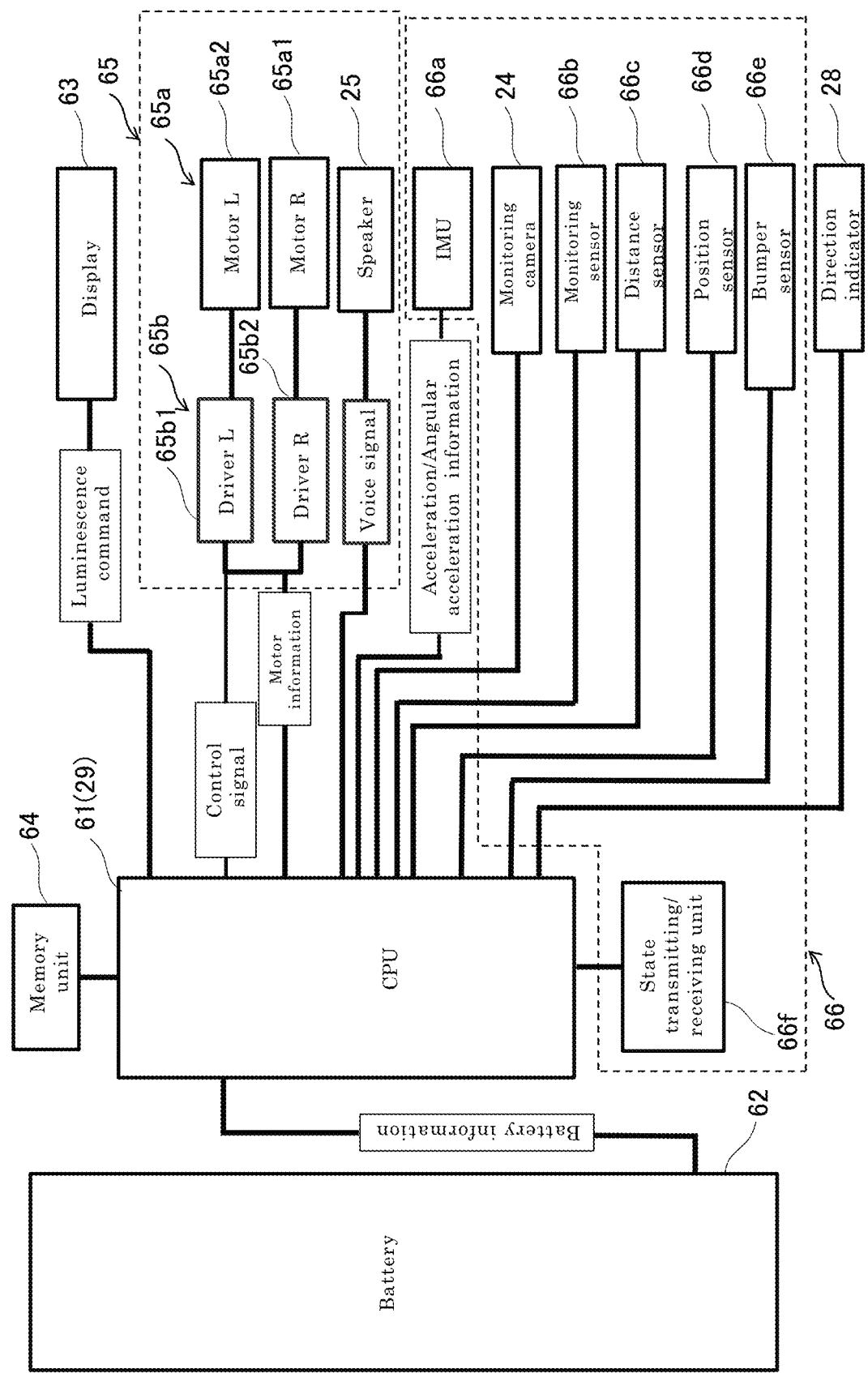
FIG. 3 is a block diagram showing the internal structure of the autonomous driving vehicle in FIG. 1.

FIG. 3 shows the structure of the control system of the autonomous driving vehicle 20. The autonomous driving vehicle 20 has a CPU 61 as a control unit 29, and to the CPU 61, a speaker 25 as a first voice output unit, a battery 62, a display 63, a memory unit 64, a drive unit 65, and a detection unit 66 are connected. The detection unit 66 includes monitoring cameras 24 as an image-shooting unit, a posture detection sensor 66a such as IMU, etc. for controlling the traveling state of the autonomous driving vehicle 20, a monitoring sensor 66b, a distance sensor 66c, a position sensor 66d, a bumper sensor 66e for detecting contact with pedestrians, bicycles, motorcycles, etc. around the vehicle, and a state transmitting/receiving unit 66f. The CPU 61 and the memory unit 64 control each device of the autonomous driving vehicle 20. The CPU 61 may be a microprocessor, microcontroller, etc. The memory unit 64 consists of DRAM and a nonvolatile memory, etc. such as hard disk drive (HDD) and flash memories. The CPU 61 and each device can be connected by using a known method such as controller area network (CAN), for example. A program for operating the autonomous driving vehicle 20 is stored in a memory medium that can be read by a computer composed of CPU 61 for executing the program, memory unit 64, etc. As the memory medium, CD-ROM, DVD-ROM, USB memory, etc. can be used. The above-mentioned program may be downloaded from the server 30 onto the memory unit 64 of the computer via a wireless network 50. The battery 62 is the power supply of the autonomous driving vehicle 20. The battery 62 is connected to the CPU 61, with the remaining level of the battery 62 and other information being monitored by the CPU 61.

The display 63 constitutes the display unit 23. In this embodiment, the predetermined eye-shaped images are displayed on the display unit 23 based on the state of the autonomous driving vehicle 20 and/or images shot by the monitoring cameras 24. The state of the autonomous driving vehicle 20 in this case means the state of moving on the traveling route such as going straight, turning left or right, and stopping, image information from the monitoring cameras 24 concerning the autonomous driving vehicle 20, and detection information from the detection unit 66. The detection information from the detection unit 66 are the information from the posture detection sensor 66a, the monitoring sensor 66b, the distance sensor 66c, the position sensor 66d, and the bumper sensor 66e, etc. The image information from the monitoring cameras 24 concerning the state of the autonomous driving vehicle 20 and the detection information from the detection unit 66 are transmitted as required from the state transmitting/receiving unit 66f to the server 30 to be described later. Images in predetermined eye-shaped patterns are displayed on the display 63 according to the luminescence commands from the CPU 61 based on the detection signals from the monitoring cameras 24. When an image appears on the display 63, the predetermined output corresponding to the image displayed may be given from the speaker 25. Furthermore, depending on the traveling or stopping state of the autonomous driving vehicle 20, the lights 27 and direction indicators 28 come on. A driver for luminescence not shown activates the lights 27 and the direction indicators 28, in response to a luminescence command from the CPU 61.

The drive unit 65 includes a motor 65a and a driver 65b for controlling the drive of the motor 65a, and the motor 65a drives the wheels 22. Specifically, based on the control signals from the CPU 61, driver L65b1 and driver R65b2 respectively control the motors 65a1, 65a2, thus driving the rear left wheel 22c and rear right wheel 22d. As described previously, the speaker 25 is arranged on the front face of the main body 21 of the autonomous driving vehicle 20 to output predetermined voice messages.

The posture detection sensor 66a is an inertial measurement unit (IMU) for example, and in this embodiment, it is an inertial measurement unit for measuring the angular velocity and the angular acceleration with respect to each axis of the autonomous driving vehicle 20 including the roll axis, the pitch axis, and the yaw axis. The monitoring sensor 66b detects pedestrians, bicycles, motorcycles, cars, and obstacles around the autonomous driving vehicle 20, especially in front of the vehicle, measures the distance between the vehicle and pedestrians or obstacles, recognizes two-dimensional and three-dimensional images of pedestrians and obstacles as well as their shapes and colors, and traces the traveling route of the autonomous driving vehicle 20. Detecting pedestrians and obstacles, the monitoring sensor 66b obtains their position coordinates and positional information about the eye level of the pedestrians etc. The display 63 may be controlled based on this positional information.

The monitoring sensor 66b can consist of a module that obtain the positional information by using a monocular camera or a stereo camera, and the LiDAR, etc. The module can consist of a CPU or a graphic processing unit (GPU) that process image data obtained from the monocular camera or the stereo camera, and the memory unit, etc. The module using the monocular camera can recognize the shape, color, and patterns of pedestrians and obstacles, and can also measure approximate distances. The module using the stereo camera is used to measure distances, recognize pedestrians, cars, and obstacles three-dimensionally, and identify their shapes and colors. The laser imaging detection and ranging (LiDAR) detects laser images and measures distances. As the LiDAR, two-dimensional or three-dimensional LIDAR may be used. The three-dimensional LiDAR can detect laser images at the front of the autonomous driving vehicle 20, measure distance from the detected object, and find the shape of the object detected. When the LiDAR is provided, the distance between the autonomous driving vehicle 20 and the object in front of the vehicle is detected, and the laser image showing the front and the data on the distance from the detected object are transmitted to the CPU 61 as detection signals.

The monitoring sensor 66b may be arranged on the front top part of the autonomous driving vehicle 20. The monitoring sensor 66b can monitor image detection and ranging of even distant pedestrians, bicycles, motorcycles, cars, etc. ahead of the autonomous driving vehicle 20. The distance sensor 66c, which measures the distance between the autonomous driving vehicle 20 and obstacles, etc., is arranged, facing the traveling direction of the autonomous driving vehicle 20, emits ultrasonic waves or infrared rays toward the obstacles present ahead of the traveling route, and by detecting their reflected waves, measures the distance up to the relevant obstacles. The position sensor 66d complements the current position of the autonomous driving vehicle 20. In this embodiment, GNSS receiving unit is used. It can be selected arbitrarily whether the position sensor 66d and the posture detection sensor 66a respectively use separate devices, or a device integrating GNSS receiving function, gyroscope sensor function, and acceleration sensor function into one package is used. By detecting contact against pedestrians, bicycles, motorcycles, etc. nearby, the bumper sensor 66e can stop autonomous traveling of the autonomous driving vehicle 20, or bring it into an emergency stop. The state transmitting/receiving unit 66f consists of a third-generation (3G), fourth-generation (4G), and fifth-generation (5G) communication module capable of making public communications, or a communication module such as wireless LAN.

The operation server 30 can remotely monitor and/or remotely operate the operation of the autonomous driving vehicle 20 based on the current position and traveling route 61c of the autonomous driving vehicle 20 or on mutual position between the autonomous driving vehicle 20 and surrounding environment, etc., and it is also possible to make the operation server control the elevator control unit 44. In this case, the autonomous driving vehicle 20 is remotely monitored and/or remotely operated by the operation server 30, and at the same time, when the autonomous driving vehicle 20 comes close to the elevator 41 of a building 40, the operation server 30 controls the elevator control unit 44 of the building 40, thereby allowing the autonomous driving vehicle 20 to use the elevator 41 of the building 40 smoothly.

In the control circuit of the autonomous driving vehicle 20 in this structure, the CPU 61 can control the drive unit 65 to ensure autonomous traveling along the predetermined route based on the detection signals from the sensors, including the posture detection sensor 66*a*, the monitoring sensor 66*b*, the distance sensor 66*c*, the position sensor 66*d*, and the monitoring cameras 24. The map data 31 for determining a traveling route is registered in the operation server 30. The CPU 61 transmits the information on current position 61*a* of the autonomous driving vehicle 20 and the input information on the destination 61*b* to the operation server 30, and a traveling route 61*c* can be determined based on the map data 31 transmitted from the operation server 30. When the elevator 41 of a building 40 is included in the traveling route 61*c*, the CPU 61 creates an elevator usage information 61*d* and an elevator control information 61*e*, and transmits them to the operation server 30 via the wireless network 50. The elevator usage information 61*d* includes the boarding and exiting floors in relation to the elevator 41 of the building 40, and the elevator control information 61*e* includes calling of an elevator cage 43 and designation of the exiting floor after boarding. Also, the CPU 61 transmits the position and the state of traveling at that time to the operation server 30 via the wireless network 50. The operation server 30 recognizes the current position and driving state of the autonomous driving vehicle 20, thus controlling the driving.

In this embodiment, the autonomous driving vehicle 20 is an electric vehicle that uses the battery 62 as a power supply and travels by driving wheels 22 using each motor 65*a* of the driving unit 65. The autonomous driving vehicle 20 displays predetermined eye-shaped images on the display unit 23 based on its traveling state and the images shot by the monitoring cameras 24 and/or the monitoring sensor 66*b*. Furthermore, the autonomous driving vehicle 20 is equipped with the speaker 25 as the first voice output unit on the front face of the main body 21, and outputs the predetermined announcement to the speaker 25 based on the traveling state of the autonomous driving vehicle 20 and/or the images shot by the monitoring cameras 24.

The operation server 30, which is installed at an appropriate position, includes a memory unit 32 for registering map data 31 required to create a traveling route of the autonomous driving vehicle 20, a control unit 33 for reading and writing the map data 31 for the memory unit 32 and controlling the operation of the autonomous driving vehicle 20, and a remote monitoring unit and/or remote operating unit not shown. In this case, the map data 31 is that concerning the area where the autonomous driving vehicle 20 can travel, such as roads and surrounding environment necessary for the autonomous driving vehicle 20 to travel, three-dimensional data showing boundaries of roads, signal positions, etc., for example, and the data on the routs around buildings and those on each floor of the buildings.

In the memory unit 32, the map data 31 is registered as a database, and based on positional information, the map data 31 containing the information on the area around the relevant position can be retrieved. Furthermore, in the case of a building 40 equipped with an elevator 41, the map data 31 includes positional information of the elevator 41 that can be used to travel to other floors within the building 40.

The control unit 33 of the operation server 30 retrieves the map data 31 on the area corresponding to the traveling route 61*c* extending from the current position to the destination from the memory unit 32 based on the information on current position 61*a* and the information on destination 61*b* transmitted from the autonomous driving vehicle 20, and transmits it to the autonomous driving vehicle 20 via the wireless network 50. Furthermore, the control unit 33 of the operation server 30 transmits the elevator usage information 61*d* sent from the autonomous driving vehicle 20 to the control server 45 of the building 40 via the wireless network 50.

The building 40 has a plurality of floors, and has the elevators 41 to enable easy transfer among floors. The elevator 41 is supported in movable state within the traveling route 42 that vertically penetrates the building 40. The elevator includes the elevator cage 43 that is made to move vertically by the driving unit not shown and an elevator control unit 44 for controlling/driving the elevator cage 43 vertically. The elevator control unit 44 is connected to the control server 45 that controls the entire building 40 via a gateway 45*a*, and the control server 45 is further connected from the gateway 45*b* to the operation server 30 via the wireless network 50. Thus, in the operation system 10 of the autonomous driving vehicle 20, the autonomous driving vehicle 20, operation server 30, and control server 45 are interconnected to the building 40 and the elevators 41, and the elevators 41 within the building 40 and electrical facilities not shown such as security gate can be controlled by the control unit 33 of the operation server 30 via the wireless network 50.

Within the elevator cage 43, a speaker 43*a* is arranged as a second voice output unit, and in the elevator hall on each floor of the building 40, speakers 41*a* are respectively arranged as a third voice output unit. In this case, a display 43*b* may be arranged within the elevator cage 43 as a second image output unit. Furthermore, on the upper part within the elevator cage 43 or on its ceiling, a camera 43*c* for monitoring the boarding state of the elevator cage 43 may be installed. Image signals obtained by the camera 43*c* are transmitted from the elevator control unit 44 to the control server 45 via the gateway 45*a*, and then from the control server 45 to the operation server 30 via the gateway 45*b* and the wireless network 50.

Here, the system is also applicable to the elevator 41 installed in buildings, etc. that adopt so-called robot management platform, which is capable of operating facilities such as elevators 41 by coordinating them with robots so that the unmanned autonomous driving robots can move easily to provide delivery, security, and cleaning services. Accordingly, the elevator control unit 44 can transmit signals for elevator calling operation when the autonomous driving vehicle 20 comes close to the elevator hall, and transmit input signals for calling the destination floor when the vehicle has got into the elevator cage 43, based on the information on current position 61*a* of the autonomous driving vehicle 20 transmitted from the autonomous driving vehicle 20 via the operation server 30, the wireless network 50, and the control server 45, thus ensuring the use of the elevator 41.

According to the autonomous driving vehicle operation system 10 of the present invention, when the autonomous driving vehicle 20 uses the elevator 41 of the building 40, the control unit 61 of the autonomous driving vehicle 20 transmits elevator usage information 61*d* and elevator control information 61*e* to the elevator control unit 44 of the building 40 via the wireless network 50. Accordingly, when the autonomous driving vehicle 20 gets in the elevator cage 43, the second voice output unit 43*a* within the elevator cage 43 gives an announcement concerning the use of the elevator 41 by the autonomous driving vehicle 20. It is also possible to allow the second image output unit 43*b* within the elevator cage 43 to output an image showing the use of the elevator by the autonomous driving vehicle 20, together with the voice announcement on the use of the elevator 41 output from the second voice output unit 43*a*, based on the elevator usage information 61*d*.

Even when the people on board the elevator cage 43 miss hearing the announcement output from the first voice output unit 25 of the autonomous driving vehicle 20 or have trouble hearing it, they can hear the announcement given as the voice output from the second voice output unit 43*a* provided within the elevator cage 43, recognizing the use of the elevator 41 by the autonomous driving vehicle 20 without fail. Furthermore, even those having difficulty in hearing due to hearing loss and hearing-impaired individuals can recognize the use of the elevator 41 by the autonomous driving vehicle 20 by seeing the image information about the use of the elevator 41 by the autonomous driving vehicle 20 on the display 43*b* within the elevator cage 43.

(Elevator Hall)

Figure 4:
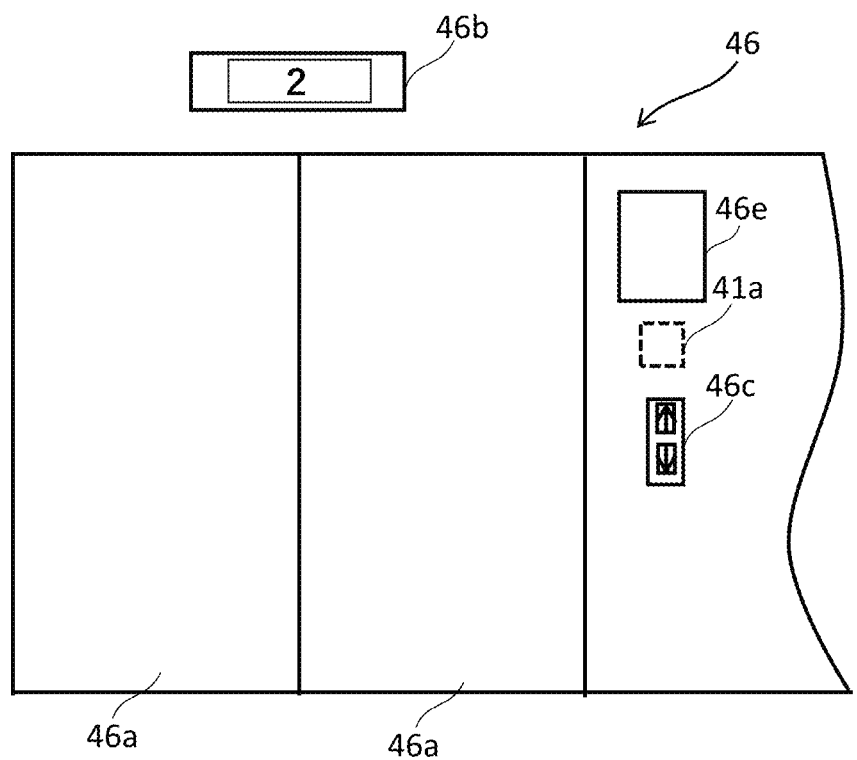
FIG. 4 is a schematic view showing the structure of an elevator hall.

FIG. 4 is a schematic view showing the structure of the elevator hall 46. The elevator hall 46 includes an elevator door 46*a*, a display unit 46*b* showing the moving of the elevator, push buttons 46*c* showing desired destination floors, a speaker (third voice output unit) 41*a*, and a display 46*e*. Image output on the display 46*e* and the voice output from the speaker 41*a* are controlled by the operation server 30 and/or the elevator control unit 44 based on the elevator usage information 61*d*. The voice output from the speaker 41*a* is given according to the flow chart in FIG. 6 to be described later. Furthermore, an image concerning boarding or exiting of the autonomous driving vehicle 20 appears on the display 46*e* along with the voice output from the speaker 41*a*. As the image, a still image or an animated image of the autonomous driving vehicle 20, or an image of the autonomous driving vehicle 20 shot by a camera installed in the elevator cage 43 can be used. The speaker 41*a* and the display 46*e* can be installed not only in the elevator hall 46 but also in the elevator cage 43, at places near the elevator hall 46, etc.

(Use of the Camera Installed in the Elevator Cage)

When the camera 43*c* is installed within the elevator cage 43, on its ceiling, for example, the elevator control unit 44 or the control server 45 integrates the number of users within the elevator cage 43 based on image signals from the camera 43*c* obtained. To integrate the number of users, various image recognition methods may be used. The ratio of the users of the elevator cage 43 to the riding capacity, namely occupancy, may also be calculated for boarding or exiting of the autonomous driving vehicle 20. The information on passengers 43*e* on the elevator cage 43, including the number of users and occupancy obtained by the control unit 44 or the control server 45, may be transmitted to the control unit 33 of the operation server 30.

As the camera 43*c*, a stereo camera capable of obtaining distance information, a time of flight (TOF) camera, the LiDAR, etc. may be used. It is also possible to use an integrated sensor for calculating the number of users within the elevator cage 43 as well as the belongings of the users based on the image signals obtained by the camera 43*c* without using the elevator control unit 44 or the control server 45. As described above, since this sensor obtains the analysis data concerning the number of users in the elevator cage 43 and occupancy based on the images of the above-mentioned camera 43*c*, TOF camera, LiDAR, etc. and/or the information such as distances, it is called an elevator analysis sensor. The elevator analysis sensor may also be configured as a modularized one having an image sensor functioning as a stereo camera or an image sensor for TOF, a computer, a memory unit, a communication substrate, etc. The elevator analysis sensor is installed on the ceiling of the elevator cage 43. The passenger information 43*e* from the elevator analysis sensor, which is the analysis data such as the number of passengers in the elevator cage 43, number of autonomous driving vehicles 20, etc., may also be transmitted to the control unit 33 of the operation server 30 via the elevator control unit 44 or via the control server 45 and the wireless network 50. Since the passenger information 43*e* from the elevator analysis sensor is the analysis data concerning the number of passengers in the elevator cage 43 and the number of autonomous driving vehicles 20 and does not include image data, the privacy can never be infringed.

The passenger information 43*e* is transmitted from the control unit 33 to the CPU 61 of the autonomous driving vehicle 20 via the wireless network 50. In that case, when a plurality of elevators 41 are installed within the building 40, the CPU 61 refers to the passenger information 43*e*, produces elevator usage information 61*d* and elevator control information 61*e* so that an uncrowded elevator is to be used, and transmits the information to the operation server 30 via the wireless network 50. Based on the passenger information 43*e* from the camera 43*c* installed within the elevator cage 43 or from the elevator analysis sensor, the autonomous driving vehicle 20 can move to and get in an elevator 41 having sufficient space for the autonomous driving vehicle to get in. The autonomous driving vehicle 20 can thus refer to the passenger information 43*e* in advance to detect elevators filled with passengers, or those filled with passengers and other autonomous driving vehicles, thereby selecting an available elevator without difficulty.

Figure 5:
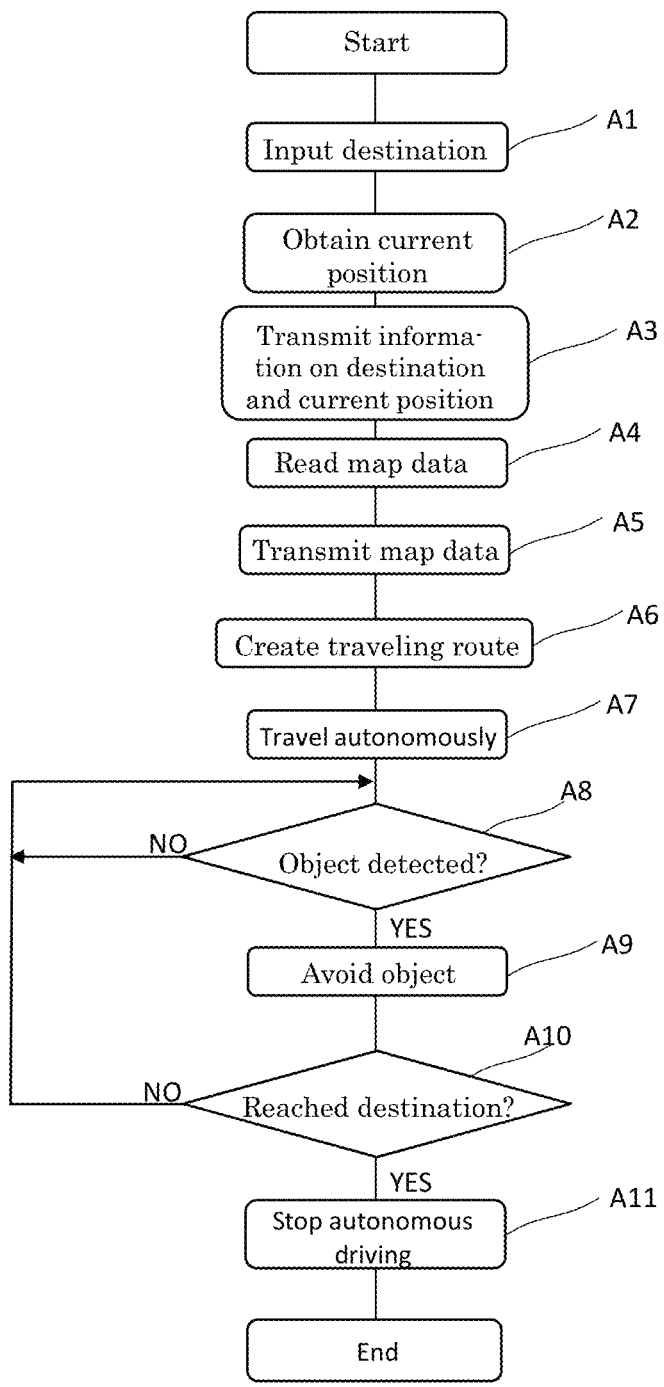
FIG. 5 is a flow chart showing the procedure of autonomous traveling according to the autonomous driving vehicle operation system in FIG. 1.

Next, the behavior of the autonomous driving vehicle operation system 10 according to this embodiment will then be described by referring to FIG. 5. The autonomous traveling of the autonomous driving vehicle 20 will be described, assuming that the elevator 41 of the building 40 is not used during the driving along the traveling route 61*c*.

First in step A1, the information on destination 61*b* showing the destination is input to the CPU 61 of the autonomous driving vehicle 20 by an operating unit not shown, or from the operation server 30. Then in step A2, the CPU 61 of the autonomous driving vehicle 20 detects the current position of the autonomous driving vehicle 20 based on the detection signal from the position sensor 66*d* and obtains the information on current position 61*a*. In step A3, the CPU 61 transmits the information on current position 61*a* and the information on destination 61*b* to the operation server 30 via the wireless network 50. In step A4, receiving the information, the control unit 33 of the operation server 30 retrieves the map data 31 of the area corresponding to the traveling route ranging from the current position given by the information on current position 61*a* to the destination given by the information on destination 61*b*, based on the information on current position 61*a* and the information on destination 61*b*, from the memory unit 32, and in step A5, transmits this map data 31 to the autonomous driving vehicle 20 via the wireless network 50.

In step A6, the CPU 61 produces a traveling route 61*c* ranging from the current position to the destination based on the information on current position 61*a* and the information on destination 61*b* as well as the map data 31, and transmits the traveling route 61*c* to the operation server 30 via the wireless network 50. In step A7, the CPU 61 controls the drive unit 65 based on the traveling route 61*c* to make the autonomous driving vehicle 20 drive autonomously along the traveling route 61*c*. During autonomous traveling, the CPU 61 of the autonomous driving vehicle 20 gives the voice output from the speaker 25 as required to inform the people around the vehicle of the presence and traveling of the autonomous driving vehicle 20. If the CPU 61 detects, in step A8, pedestrians, bicycles, motorcycles and other vehicles or objects such as obstacles while traveling based on the detection signals from the detection unit 66, namely the posture detection sensor 66a, the monitoring sensor 66b, the distance sensor 66c, the position sensor 66d, and the monitoring camera 24, the CPU 61 controls the drive unit 65 in step A9 so as to change the travelling route 61c, stop the autonomous driving vehicle, or bring it to an emergency stop, to avoid contact with those objects. The operation server 30 is monitoring the autonomous traveling of the autonomous driving vehicle 20 by referring to the traveling route 61c received from the autonomous driving vehicle 20 before the start of autonomous traveling and the information on current position 61a transmitted sequentially from the autonomous driving vehicle 20. If the autonomous driving vehicle 20 deviates largely from the traveling route 61c, the autonomous driving vehicle 20 may be made to stop or brought into an emergency stop. When the autonomous driving vehicle 20 reaches the destination in step A10, the CPU 61 controls the drive unit 65 in step A11 to stop the autonomous traveling, and thus autonomous driving is completed.

Figure 6:
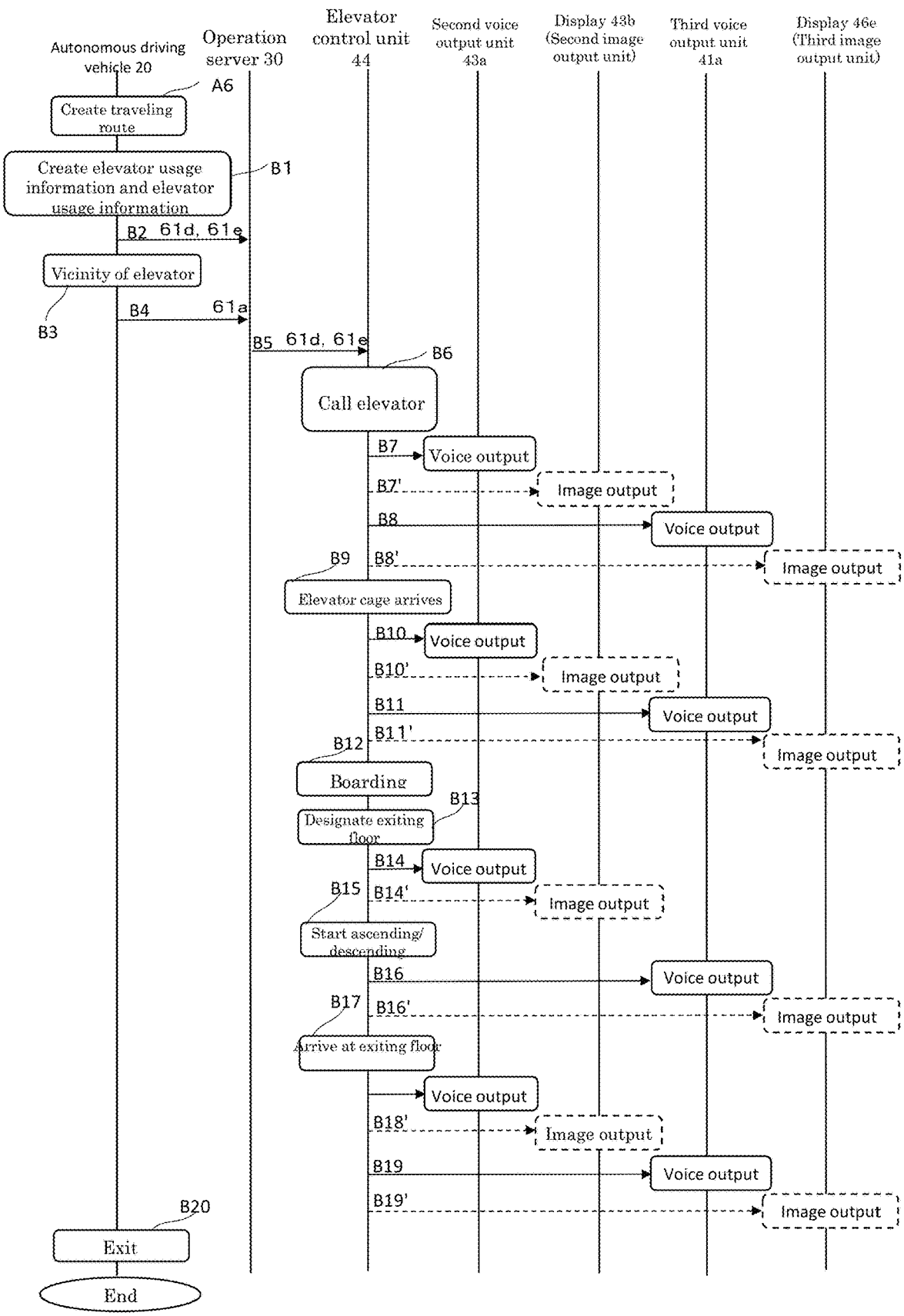
FIG. 6 is a flow chart showing the operation of the autonomous driving vehicle in FIG. 1 when it uses an elevator.

The autonomous traveling of the autonomous driving vehicle 20 in the case where an elevator 41 of a building 40 is used will hereinafter be described further in detail by referring to the flow chart in FIG. 6.

After creating the traveling route 61c in step A6 described above, the CPU 61 produces the elevator usage information 61d and the elevator control information 61e in step B1, and in step B2, transmits these elevator usage information 61d and elevator control information 61e to the operation server 30 via the wireless network 50.

In step B3, when the autonomous driving vehicle 20 comes close to the elevator hall on the floor where the vehicle is to get in the elevator 41 of the building 40, the operation server 30 detects proximity of the autonomous driving vehicle 20 to the elevator in Step B4 based on the information on current position 61a from the autonomous driving vehicle 20, and in step B5, transmits the elevator usage information 61d and the elevator control information 61e from the control server 45 to the elevator control unit 44 via the wireless network 50. Receiving the information, the elevator control unit 44 calls the elevator 41 on the relevant boarding floor in step B6 based on the elevator control information 61e, of these elevator usage information 61d and the elevator control information 61e, and in step B7, gives voice output "An autonomous driving vehicle will be on board from floor /// to floor /////. Thank you for your cooperation." through the speaker 43a within the elevator cage 43 as the second voice output unit based on the elevator usage information 61d, thus informing the passengers in the elevator cage 43 of the expected boarding of the autonomous driving vehicle 20. If the elevator cage 43 has a second image output unit 43b, it is also possible to give an image display "An autonomous driving vehicle will be on board from floor /// to floor /////. Thank you for your cooperation." on the display 43b within the elevator cage 43 in step B7' based on the elevator usage information 61d together with the voice output in step B7.

At the same time as step B7, the elevator control unit 44 gives voice output "An autonomous driving vehicle will be on board from floor /// to floor /////. Thank you for your cooperation." in step B8 from speaker 41a installed in the elevator hall on the boarding floor as the third voice output unit, informing the people in the elevator hall of the boarding floor of the boarding of the autonomous driving vehicle 20. Furthermore, if the elevator hall 46 has a third image output unit 46e, it is also possible to display the same notice on the display 46e of the elevator hall 46 in step B8' along with the above-mentioned voice output based on the elevator usage information 61d.

In step B9, the elevator cage 43 reaches the boarding floor and the door opens, and in step B10, the elevator control unit 44 gives the voice output "Floor /////. The autonomous driving vehicle will get in. Thank you for your cooperation." from the speaker 43a within the elevator cage 43, informing the passengers in the elevator cage 43 of the boarding of the autonomous driving vehicle 20. When the elevator cage 43 has the second image output unit 43b, the same notice may be displayed in step B10' on the display 43b within the elevator cage 43 together with the voice output in Step B10 based on the elevator usage information 61d.

At the same time as step B10, in step B11, the elevator control unit 44 gives voice output "The autonomous driving vehicle will get in. Thank you for your cooperation.", informing the people in the elevator hall on the boarding floor of the boarding of the autonomous driving vehicle 20. If the elevator hall 46 has the third image output unit 46e, it is also possible to display the image showing the same notice on the display 46e of the elevator hall 46 in step B11' along with the above-mentioned voice output based on the elevator usage information 61d.

After the autonomous driving vehicle 20 gets in the elevator cage 43 and the door of the elevator cage closes in step B12, the elevator control unit 44 designates the floor where the vehicle is to get off the elevator cage 43 in step B13 based on the elevator control information 61e, and in step B14, gives voice output "The autonomous driving vehicle has boarded on floor ///. The vehicle will get off on floor /////. Thank you for your cooperation." from the speaker 43a within the elevator cage 43 based on the elevator usage information 61d, informing the passengers in the elevator cage 43 of the expected exit of the autonomous driving vehicle 20. If the elevator cage 43 has the second image output unit 43b, the same notice may be displayed on the display 43b within the elevator cage 43 in step B14' based on the elevator usage information 61d.

In step B15, the elevator cage 43 starts ascending/descending from the boarding floor, and in step B16, the elevator control unit 44 gives voice output "The autonomous driving vehicle will get off. Thank you for your cooperation." from the speaker 41a provided in the elevator hall on the floor where the autonomous driving vehicle 20 is to get off, announcing the expected exit of the autonomous driving vehicle 20. When the elevator hall 46 has the third image output unit 46e, an image showing the same notice may be displayed on the display 46e in the elevator hall 46 in step B16' along with the above-mentioned voice output based on the elevator usage information 61d.

In step B17, the elevator cage 43 reaches the exiting floor, and in step B18, the elevator control unit 44 gives voice output "Floor /////. The autonomous driving vehicle will get off. Thank you for your cooperation." from the speaker 43a in the elevator cage 43, informing the passengers in the elevator cage 43 of the expected exit of the autonomous driving vehicle 20. If the elevator cage 43 has a second image output unit 43b, an image showing the same notice may be displayed on the display 43b in the elevator cage 43 in step B18' along with the voice output in step B12.

At the same time as step B18, in step B19, the elevator control unit 44 gives voice output "The autonomous driving vehicle will get off. Thank you for your cooperation." from the speaker 41a provided in the elevator hall on the relevant exiting floor, informing the people in the elevator hall on the exiting floor of the expected exit of the autonomous driving vehicle 20. If the elevator hall 46 has the third image output unit 46e, an image showing the same notice may be displayed on the display 46e of the elevator hall 46 in step B18' along with the above-mentioned voice output. The autonomous driving vehicle 20 then gets off the elevator cage 43 in step B20. The use of the elevator 41 in the building 40 by the autonomous driving vehicle 20 can thus be completed.

In the above description, the autonomous driving vehicle 20 does not give voice output from the speaker 25 when using the elevator 41. However, the autonomous driving vehicle 20 may be made to give a voice announcement about the use of the elevator as required, together with the output from the speaker 43a as the second voice output unit and from the speaker 41a as the third voice output unit. Furthermore, the elevator control unit 44 may be allowed to give voice output announcing the boarding of the autonomous driving vehicle from the boarding floor to the exiting floor from the second voice output unit 43a based on the elevator usage information 61d during the period from before the boarding to exiting of the autonomous driving vehicle 20. The passengers on the elevator 41 can anticipate the use of the elevator by the autonomous driving vehicle 20 before boarding by listening to the announcement informing of the boarding of the autonomous driving vehicle 20 from the second voice output unit 43a. Since the elevator control unit 44 respectively has a third voice output unit 41a in the elevator hall of the elevator 41 on each floor, it is also possible that the elevator control unit 44 gives voice output, announcing the use of the elevator by the autonomous driving vehicle 20, from the third voice output unit 41a provided on the boarding or exiting floor based on the elevator usage information 61d. According to this structure, the people waiting for the elevator 41 in the elevator hall can take actions such as making space for the autonomous driving vehicle 20 when the autonomous driving vehicle 20 gets in, or giving way when the autonomous driving vehicle 20 gets off, by hearing the announcement from the third voice output unit 41a concerning the use of the elevator by the autonomous driving vehicle 20.

Second Embodiment

In the first embodiment, the boarding and exiting from the elevator 41 by the autonomous driving vehicle 20 were described. The elevators 41 could be those installed in buildings 40 such as not only commercial and hotel buildings but also large-scale housing complex buildings. In the second embodiment, the use of information pertaining to the usage situation of the elevator 41 will be described.

Figure 7:
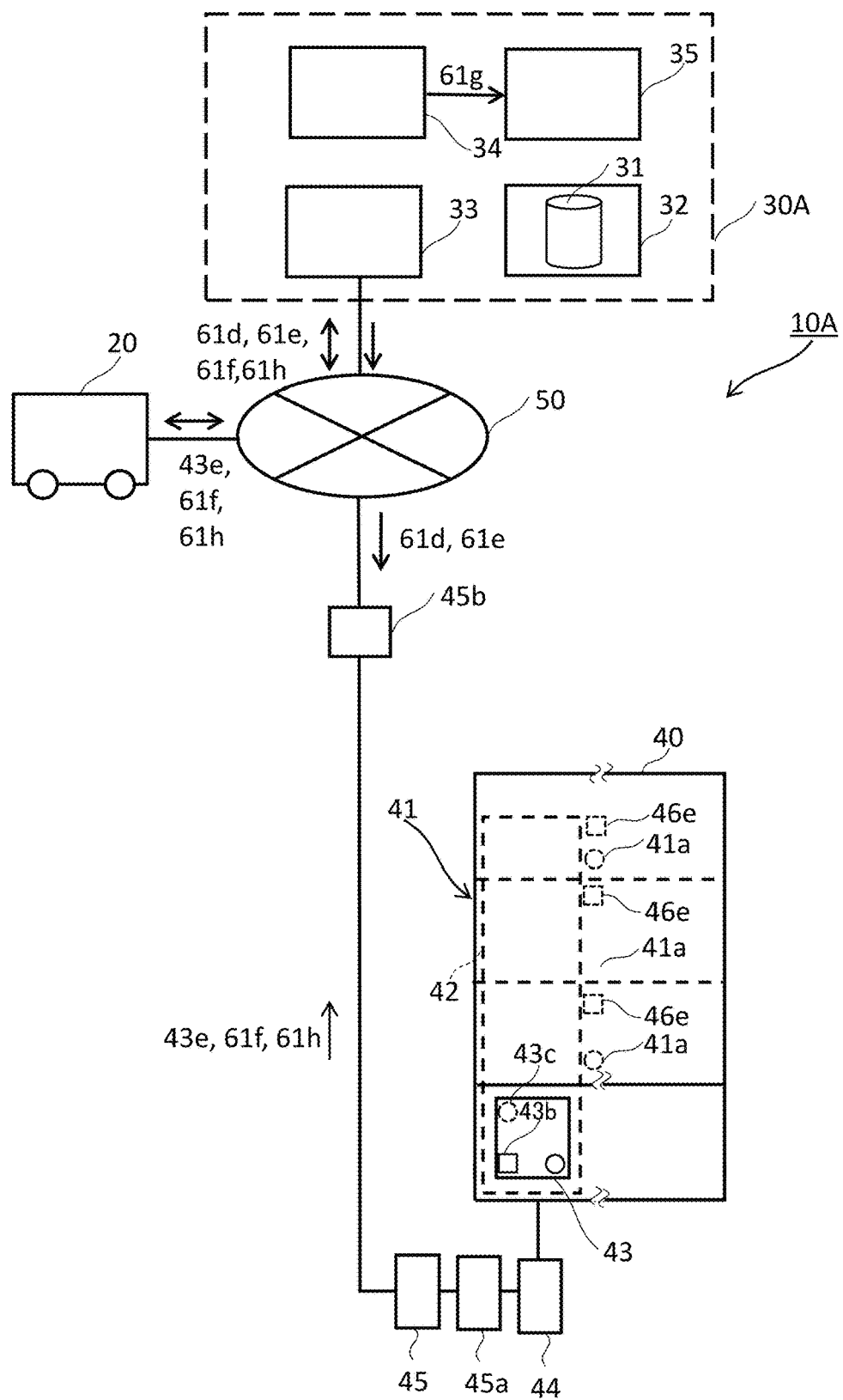
FIG. 7 is a block diagram showing the structure of a second embodiment of the autonomous driving vehicle operation system.

FIG. 7 is a block diagram showing the structure of the second embodiment of the autonomous driving vehicle operation system according to the present invention. The operation system 10A for autonomous driving vehicles shown in FIG. 7 differs from the operation system 10 for autonomous driving vehicle 10 as shown in FIG. 1 is that the server 30A includes an analysis unit 34 for analyzing an statistical elevator usage information 61f transmitted from the elevator control unit 44, and a traveling route creation unit 35 for creating a traveling route of the autonomous driving vehicle 20 based on an in-house probability information 61g on each floor obtained by analyzing the statistical elevator usage information 61f. More specifically, the statistical elevator usage information 61f is transmitted from the elevator control unit 44 to the server or the operation server 30A via the gateway 45a or the control server 45. For example, since the elevator control unit 44 obtains the information on the move of the elevator from each floor to the ground floor of a housing building, the number of times of elevator usage down to the ground floor in the morning can be found for each floor by analyzing the number of times of move to each floor. Since the number of households in each floor is known, the probability of residents' presence, namely in-house probability, can be obtained statistically. The in-house probability information 61g analyzed by the analysis unit 34 is transmitted to the traveling route creation unit 35 of the operation server 30A for the autonomous driving vehicle 20.

In this case, if the autonomous driving vehicle 20 is a delivery robot, the traveling route creation unit 35 creates data on an traveling route 61h for traveling of the autonomous driving vehicle 20 so that the delivery is performed in descending order of in-house probability to ensure efficient delivery by the autonomous driving vehicle 20, and the data is transmitted from the operation server 30A to the autonomous driving vehicle 20 via the wireless network 50. By using the operation system 10A for autonomous driving vehicles according to the present invention, the delivery can be made during the time slots or day of the week having high in-house probability, which significantly reduces the number of man-hour and costs for redelivery incurred by absence. On the ceiling of the elevator cage 43 of the elevator 41, the above-mentioned elevator analysis sensor may be installed. The passenger information 43e according to the elevator analysis sensor is the analysis data on the number of passengers in the elevator cage 43 and the number of autonomous driving vehicles 20. By using the data while performing detection of the move of the elevator, the passenger information 43e can be obtained without fail. In addition, since the information contains no image data of users, the privacy can never be infringed. In this case, the analysis unit 34 may perform analysis by adding the passenger information 43e from the elevator analysis sensor to the above-mentioned statistical elevator usage information 61f. The analysis unit 34 can create the traveling route of the autonomous driving vehicle 20 based on the statistical elevator usage information transmitted from the elevator control unit 44 and/or the passenger information 43e from the elevator analysis sensor.

The present invention can be executed in various embodiments without departing from the scope of the present invention. For example, in the above-mentioned embodiments, the building 40 has one elevator 41, but the autonomous driving vehicle 20 can also use an elevator 41, of a plurality of elevators, in a building 40 having two or more elevators. In this case, it is also possible to specify which elevator 41 the autonomous driving vehicle 20 is to take by voice output.

Third Embodiment

In the first and the second embodiments, boarding and exiting from the elevator 41 by the autonomous driving vehicle 20 were described. The autonomous driving vehicle 20 can also use elevators 41 in multi-story buildings 40 having a plurality of autonomous driving vehicles and elevators 41. In this embodiment, the operation system in the case where two or more autonomous driving vehicles 20 use a plurality of elevators 41B installed in a multi-story building 40 will be described.

Figure 8:
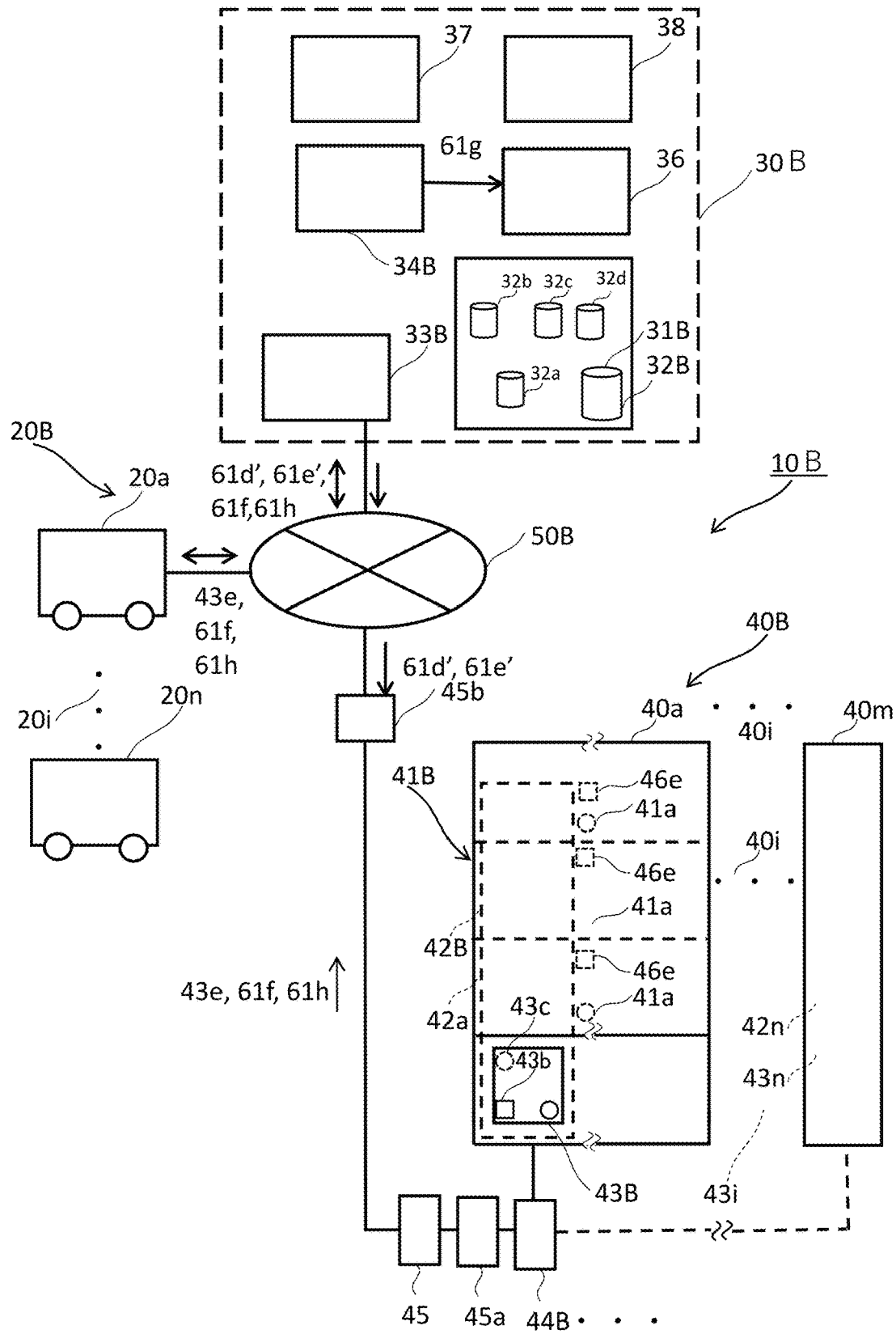
FIG. 8 is a block diagram showing the structure of a third embodiment of the autonomous driving vehicle operation system.

FIG. 8 is a block diagram showing the structure of the third embodiment of the autonomous driving vehicle operation system according to the present invention. The autonomous driving vehicle operation system 10B as shown in FIG. 8 differs from the autonomous driving vehicle operation system 10A as shown in FIG. 7 in that the server 30B is configured as an autonomous driving vehicle operation system that allows a plurality of autonomous driving vehicles 20B to use a plurality of elevators 41B installed in a plurality of buildings 40B. Each of the plurality of autonomous driving vehicles 20B (20a-20i-20n) is connected to the server 30B via a network 50 in the same way as the autonomous driving vehicle operation system 10A as shown in FIG. 7. The plurality of buildings 41B (41a-41i-41n) have a plurality of elevators 42B (42a-42i-42m). Each building may have only one or two or more elevators. The traveling routes of the plurality of autonomous driving vehicles 20B in each building may be provided with security gates, in addition to the elevator 42B. Each elevator 42i is connected to the server 30B via the elevator control unit 44B, a gateway 45a, a control server 45B, a gateway 45b, and a network 50B.

The operation server 30B constitutes a robot management platform, and comprises: a memory unit 32B for registering a map data 31B, etc. necessary to create the traveling route of the autonomous driving vehicles 20B; a control unit 33B for reading/writing the map data 31 for the memory unit 32B and controlling the operation of the autonomous driving vehicles 20B; an analysis unit 34B for analyzing the traveling of the autonomous driving vehicles 20B and their use of elevators; a traveling control unit 35B for controlling the traveling of the autonomous driving vehicles 20B; the above-mentioned remote monitoring unit and/or remote operating unit 36; and a cooperation unit 37. The map data 31B is the data on roads and surrounding environment necessary for the autonomous driving vehicles 20B to travel pertaining to the areas where the plurality of autonomous driving vehicles 20B can travel, namely, three-dimensional data including the information on road boundaries, signal positions, etc., rooms on each floor of the plurality of buildings 41B, corridors as passages, elevators, and security gates.

The operation server 30B consists of a computer, server, etc. comprising: a CPU; memory unit with the nonvolatile memory having a HDD or SSD, which uses flash memory, DRAM, which is a volatile memory; and according to needs, an input device such as a keyboard, etc.; and an output device such as an display for displaying images, etc. of the monitoring camera of the autonomous driving vehicle. The operation server 30B may be a cloud server. With the operation server 30B, a program for the operation server is stored in the memory unit 32B. As a result of the program for the operation server being executed by the CPU, the analysis unit 34B, the traveling control unit 36, the remote monitoring unit and/or remote operating unit 38, and the cooperation unit 37 are made to function.

The cooperation unit 37 has a function of establishing communication between the plurality of autonomous driving vehicles 20B and the plurality of elevators 42B installed in each building, the security gate, etc. as required. The cooperation unit 37 supports various communication protocols so that communication systems unique to each of the manufacturing companies of the plurality of autonomous driving vehicles 20B can be used. The communication systems include MQ telemetry transport (MQTT), which is a protocol used for communication between devices, programmable logic controller (PLC), OPC unified architecture (OPC UA: open-source industrial interface by OPC Foundation), etc. The data that supports these communication systems used by the cooperation unit 37 is stored as the database for connection 32a of the memory unit 32B.

The cooperation unit 37 further connects the plurality of elevators 42B installed in each building to the security gate, etc. by the application program interface (API) stored in the database for connection 32a.

Once the plurality of autonomous driving vehicles 20B are connected to the operation server 30B via the network 50B, the control unit 33B of the operation server 30B controls the cooperation unit 27 to start communication using the communication system of each autonomous driving vehicle 20B, and by detecting identification numbers (ID) of each autonomous driving vehicle 20B, the type, company that owns the vehicle, etc. of the autonomous driving vehicle 20B are recognized. The tasks, work hours, etc. of each autonomous driving vehicle 20B recognized by the control unit are controlled by the traveling control unit 36 to be described later. The analysis unit 34B has, as in the case of the autonomous driving vehicle operation system 10A, a function of analyzing not only the data obtained from facilities such as elevators but also the data obtained from the plurality of autonomous driving vehicles 20B, and a function of performing simulations regarding various usage situations and use of the autonomous driving vehicle operation system 10B. The data for analysis to be used by the analysis unit 34B is stored in a database for analysis 32b of the memory unit 32B. Streamlining and problems can be visualized based on the data obtained from the plurality of autonomous driving vehicles 20B and facilities such as the plurality of elevators.

Figure 9:
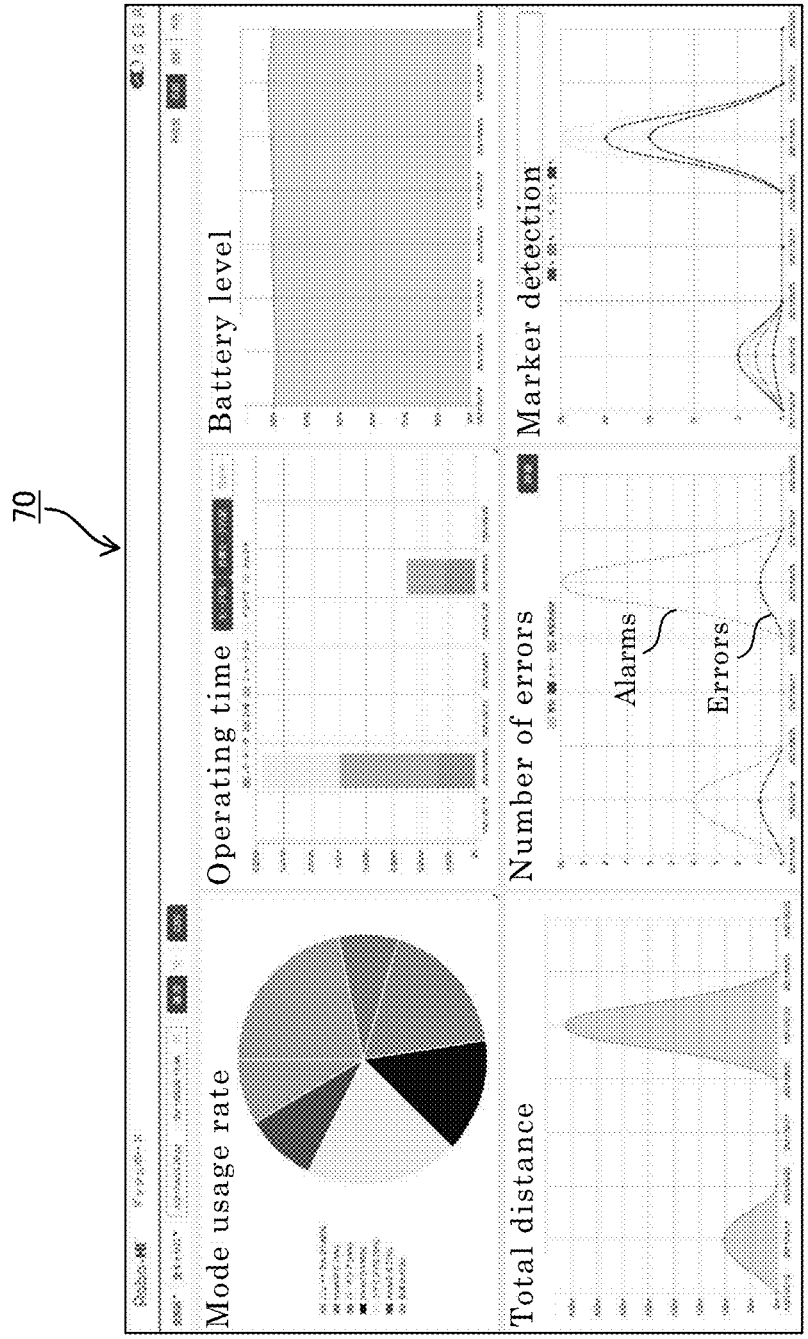
FIG. 9 is a figure showing a typical display screen of an operation server used when data analysis of the autonomous driving vehicle is performed.

FIG. 9 shows a typical display screen 70 in the case where the data of autonomous driving vehicles 20 is analyzed. As the autonomous driving vehicle 20, the operation state and basic indexes of the autonomous driving vehicle for delivering cargos within a warehouse are monitored, and data is compiled and analyzed to improve work efficiency.

In FIG. 9, as the data to be analyzed, a mode usage rate is shown at the upper left, an operating time at the upper center, a battery level at the upper right, a total distance at the lower left, a number of errors at the lower center, and a detection of markers at the lower right of the screen. The mode usage rate expresses in percentage in what mode the autonomous driving vehicle 20 has been a neutral, a parking, or a driving, etc. The horizontal axis of the other charts represents year, month, and date concerning the everyday operation. The operating time is a chart showing the ratio of traveling mode of the autonomous driving vehicle 20 on the day of operation. The battery level shows the day-by-day battery level of the autonomous driving vehicle 20. The total distance shows the day-to-day traveling distance of the autonomous driving vehicle 20. The number of errors shows the number of times of issuance of alarms, the occurrence of errors, and the detection of obstacles during the day-to-day operation of the autonomous driving vehicle 20. The chart shown indicates a case where no obstacles were detected. Markers are attached to the floors or wall surfaces of buildings to indicate direction of traveling of the autonomous driving vehicle 20. Detection of markers indicates the frequency of detection of markers for direction indication during day-to-day operation of the autonomous driving vehicle 20. The types of the markers include the straight, the left turn, the right turn, the stop, the U-turn, etc. (See Patent Literature 2). As shown by the display screen 70 in FIG. 9, a function of downloading comma separated value (CSV) files, etc. are implemented for the analysis unit 34B to provide a graphical display, a designate periods, and a display data, thereby monitoring basic indexes of the autonomous driving vehicle.

By using the analysis unit 34B, the usage state and basic indexes of the autonomous driving vehicles and facilities such as elevators working with the autonomous driving vehicles can be monitored, compiled, and analyzed to improve the usage state of each autonomous driving vehicle 20i and facilities including each elevator 41i, etc. Each autonomous driving vehicle 20i of different manufacturers can also be supported. It thus becomes possible to set the flow of people/materials to buildings, roads around the buildings, etc. where a plurality of autonomous driving vehicles 20B travel, and perform physical simulations to find appropriate operation areas of the autonomous driving vehicles and the number of vehicles needed. Based on such simulations, digital reproductions (called digital twins) of the flow of people/materials in town and virtual space (metaverse) can be created using computers.

As in the case of the autonomous driving vehicle operation system 10A, the traveling control unit 36 has a function of creating traveling routs for the autonomous driving vehicles 20B, and at the same time has a function of controlling the plurality of autonomous driving vehicles 20B, a function of managing tasks regarding the assignment of tasks and creation of operation schedule for the plurality of autonomous driving vehicles 20B, and a function of setting interlocking with facilities such as elevators and/or security doors, etc. As the traveling route creation function of the traveling control unit 36, traveling routs of the plurality of autonomous driving vehicles 20B are created, and their priority areas as well as areas where traveling is prohibited, etc. are set. If the plurality of autonomous driving vehicles 20B are manufactured by a plurality of manufacturers, the control by the traveling control unit 36 can be performed by each group of the manufacturers. The data regarding the traveling control used by the traveling control unit 36 is stored in the database for traveling control 32c of the memory unit 32B. The traveling control unit 36 ensures centralized control of the plurality of autonomous driving vehicles 20B. With the operation server 30B of the autonomous driving vehicle operation system 10B, the plurality of autonomous driving vehicles 20B can be remotely monitored and/or remotely operated by the remote monitoring unit and/or remote operating unit 38.

The control unit 33B registers the target autonomous driving vehicles 20B to the traveling control unit 36. The state of the registered autonomous driving vehicles 20B is monitored periodically by the remote monitoring unit and/or remote operating unit 38. The image information from the monitoring cameras 24 of each autonomous driving vehicle 20 and the detection information from the detection unit 66 are transmitted to the remote monitoring unit and/or remote operating unit 38 as required by the state transmitting/receiving unit 66f. For example, the information on current position 61a from each autonomous driving vehicle 20i is transmitted from the control unit 33B to the remote monitoring unit and/or remote operating unit 38 via the network. The data on remote monitoring and/or remote operation used by the remote monitoring unit and/or remote operating unit 38 is stored in the database for remote monitoring/remote operation 32d of the memory unit 32B.

The information on current position 61a of each autonomous driving vehicle 20a is displayed on the map, and thus the information on current position 61a of the plurality of autonomous driving vehicles 20B is displayed. The information on current position 61a may be displayed on the display of the operation server 30B. The information on current position 61a may also be updated continuously or at specified intervals and displayed on the display. The information on current position 61a of the plurality of autonomous driving vehicles 20B is thus displayed on the map in real time.

Figure 10:
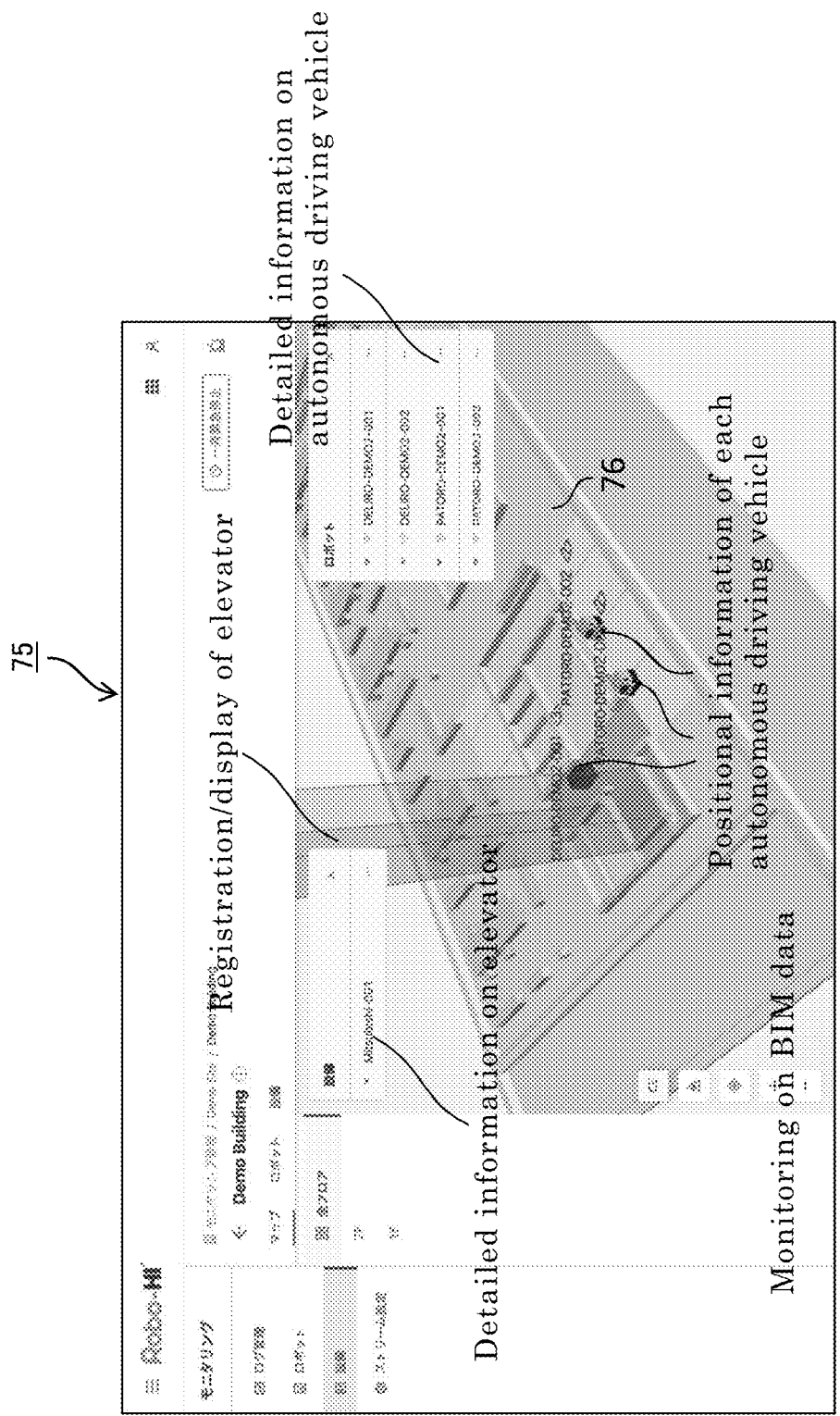
FIG. 10 is a figure showing a typical monitoring by the remote monitoring unit and/or the remote operating unit.

FIG. 10 shows a typical monitoring by the remote monitoring unit and/or remote operating unit 38. FIG. 10 shows a monitoring screen, namely a building information modeling (BIM data) screen 70 that three-dimensionally displays a floor 71 of a building equipped with the elevator 41B where an autonomous driving vehicle for delivery 20C and an autonomous driving vehicle for monitoring 20D are shown. The position of the autonomous driving vehicle for delivery 20C and that of the autonomous driving vehicle for monitoring 20D are displayed on the model data based on the information on current position 61a. The information on registration of the elevator, the detailed information on the manufacturer of the elevator, and detailed information on the autonomous driving vehicle for delivery 20C and that of the autonomous driving vehicle for monitoring 20D are displayed. A plan view of each floor of the building 40 may also be displayed as a computer aided design (CAD) display on the model data screen 70, or on a separate window.

Furthermore, the information on destination 61b of each autonomous driving vehicle 20 may appear on the display. Also, to describe the operation state of each autonomous driving vehicle 20, that of the autonomous driving vehicle for delivery for example, "Delivering," "Delivered," and "Standby" may be displayed as the operation state. If any abnormalities should be found on the image of the monitoring cameras from each autonomous driving vehicle 20 as the result of monitoring by the administrator of the operation server 30, the administrator may remotely operate each autonomous driving vehicle 20 from the remote monitoring unit and/or remote operating unit 38 to stop it, or may give an announcement such as "The vehicle will come to an emergency stop." from the first voice output unit 25 of each autonomous driving vehicle 20. If the battery level has decreased and periodic maintenance is judged to be necessary, the administrator may stop each autonomous driving vehicle 20 by remotely operating the vehicle from the remote monitoring unit and/or remote operating unit 38. The administrator may then contact the person in charge of maintenance of each autonomous driving vehicle 20 and other designated persons in charge.

The operation server 30B controls the elevator control unit 44B of the building 40i when each autonomous driving vehicle 20 comes close to the elevator 41B of the building 40B, thereby ensuring smooth usage of the elevator 41i of each building 40i by each autonomous driving vehicle 20i. In this case, if a plurality of elevators 41B are installed in the building 40, the traveling control unit 36 can create a traveling route 61c' based on the map data 31B as same as in the case of the operation server 30. If the traveling route 61c' includes the plurality of elevators 41B of the building 40, the traveling control unit 36 inquires the elevator control unit 44B about the usage state of the plurality of elevators 41B. Receiving the usage state of the elevators 41B from the elevator control unit 44B, the traveling control unit 36 creates a traveling route 61c', designating an available elevator, and transmits it to each autonomous driving vehicle 20i via the network 50B. Receiving the traveling route 61c', the CPU 61 of each autonomous driving vehicle 20i creates the elevator usage information 61d' and the elevator control information 61e' accordingly, and transmits them to the operation server 30B via the wireless network 50B. The elevator usage information 61d' includes boarding and exiting floors of the elevator 41i in each building 40i, and the elevator control information 61e' includes designation of calling of the elevator cage 43B and that of exiting floor after boarding. The elevator usage information 61d' may include image information obtained by the camera 43c installed on the ceiling, for example, within the elevator cage 43.

The elevator usage information 61j transmitted from the elevator control unit 44B may be transmitted to the analysis unit 34B. The analysis unit 34B can analyze the elevator usage information 61j, and transmit the information on available elevator to the traveling control unit 36 in real time. Receiving the information, the traveling control unit 36 can create a traveling route 61c' that contains the optimal available elevator 41B for each autonomous driving vehicle 20 even when a plurality of elevators 41B, for example 6 or 8 elevators, are installed on the same floor of the building.

The traveling route 61c' of each autonomous driving vehicle 20i, elevator usage information 61d', and elevator control information 61e' are also transmitted to the remote monitoring unit and/or remote operating unit 38 from the traveling control unit 36, and the positional information and the elevator usage information 61d' of each autonomous driving vehicle 20 are displayed on the monitoring screen described by referring to FIG. 10.

According to the elevator control by the traveling control unit 36, by selecting a vacant elevator or the one with least passengers, the psychological burden on the passengers resulting from sharing the elevator cage with the autonomous driving vehicle 20 can be reduced. The inside of the elevator cage 43 is detected by a sensor such as elevator analysis sensor using camera 43c or camera and LiDAR. Even if there is an elevator cage 43 having sufficient space for the autonomous driving vehicle 20, by selecting an elevator 20 having larger space, the sense of passengers of feeling tight can be decreased. With a large elevator cage 43, it is possible for the autonomous driving vehicle 20 to get in from the center into the right or left side of the elevator cage. If more space is available, another autonomous driving vehicle 20 may be allowed to get in.

The traveling control unit 36 may be allowed to designate one or two specific elevator cage(s) as being exclusive for autonomous driving vehicles 20, in cooperation with the elevator control unit 44B, during elevator rush hours such as the beginning of office hours, the lunch time, and the time to go home in the evening. It is also possible to increase the number of elevators exclusive for autonomous driving vehicles 20B during the time slot when elevators 41B are not used so frequently to increase the operation rate of the plurality of autonomous driving vehicles 20B.

The autonomous driving vehicle operation system 10 according to the present invention is equipped with a control server 45 for controlling the entire building 40. It is also possible to control the elevator control unit 44 by allowing the operation server 30A to control the control server 45 based on the elevator usage information 61d and the elevator control information 61e. According to this structure, the control server 45 recognizes the autonomous driving vehicle 20 when the autonomous driving vehicle 20 enters the building 40, and at the same time, it is possible to give an announcement concerning the elevator usage by the autonomous driving vehicle 20 from the second voice output unit 43a within the elevator cage 43 based on the elevator usage information 61d and the elevator control information 61e received directly from the control unit 61 of the autonomous driving vehicle 20 or via the operation server 30A.

As the autonomous driving vehicle operation system 10 according to the present invention, the case where the autonomous driving vehicle 20 has its own speaker 25 (the first voice output unit) was described. However, the system is also applicable to a case where the autonomous driving vehicle 20 does not have a speaker. When the autonomous driving vehicle does not have a voice output unit, just like a cleaning robot or a delivery robot, and the traveling route includes an elevator 41 of a building 40, the control unit 20 of the autonomous driving vehicle may transmit the elevator usage information 61d and the elevator control information 61e to the elevator control unit 44 via the wireless network 50, and the elevator control unit 44 may give an announcement concerning the usage of the elevator by the autonomous driving vehicle from the voice output unit 43a installed in the elevator cage 43 based on the elevator usage information 61d. Instead of the announcement concerning elevator usage, it is also possible to output an image concerning the use of the elevator 41 by the autonomous driving vehicle from a second image output unit 43b in the elevator cage 43 based on the elevator usage information 61d. It is also allowed to give an announcement from the voice output unit 43a together with this image output.

As the autonomous driving vehicle operation systems 10, 10A, 10B according to the present invention, a case where the autonomous driving vehicle 20 is a delivery vehicle was descried. However, it is also possible that traveling routes are shared by working vehicles for cleaning, disinfection, monitoring, etc. and passenger vehicles for transporting users. When the autonomous driving vehicle 20 is a passenger vehicle for transporting users in stations, airports, etc. as means of transportation, a display system having a touch panel function for users to use the autonomous driving vehicle 20, a camera and a scanner for reading the QR code (registered trademark) to authenticate users, a transmitting/receiving unit for near field communication (NFC), etc. may also be provided.

REFERENCE SIGNS LIST 10,10A: Operation system, 20: Autonomous driving vehicle, 21: Main body, 22: Wheel, 23: Display unit, 24: Monitoring camera, 25: Speaker (First voice output unit), 26: Housing unit, 27: Light, 28: Direction indicator, 29: Control unit, 30, 30A: Server (Operation server), 31, 31B: Map data, 32, 32B: Memory unit, 32a: Database for connection, 32b: Database for analysis, 32c: Database for traveling control, 32d: Database for remote monitoring/remote operation, 33, 33A, 33B: Control unit, 34, 34B: Analysis unit, 35: Traveling route creation unit, 36: Traveling control unit, 37: Cooperation unit, 38: Remote monitoring unit and/or remote operating unit, 40, 40B: Building, 41, 41B: Elevator. 41a: Speaker (Third voice output unit), 42: Traveling route, 43, 43B: Elevator cage, 43a: Speaker (Second voice output unit), 43b: Display (Second image output unit), 43c: Camera (Elevator analysis center), 43e: Passenger information, 44, 44B: Elevator control unit, 45, 45B: Control server, 45a, 45b: Gateway, 46, 46B: Elevator hall, 46a: Elevator door, 46b: Display unit showing elevator movement, 46c: Pushbutton, 46e: Display (Third image output unit), 50: Wireless network; 61: CPU; 61a: Information on current position, 61b: Information on destination, 61c, 61c': Traveling route, 61d, 61d': Elevator usage information, 61e, 61e': Elevator control information, 61f: Statistical elevator usage information, 61g: In-house probability information, 61*h*: Data on traveling route, 62: Battery, 63: Display, 64: Memory unit, 65: Drive unit, 65*a*: Motor, 65*b*: Driver, 66: Detection unit, 66*a*: Posture detection sensor, 66*b*: Monitoring sensor, 66*c*: Distance sensor, 66*d*: Position sensor, 66*e*: Bumper sensor, 66*f*: State transmitting/receiving unit, 70: Display screen, 75: Model data screen, 76: Building floor

What is claimed is:

1. An autonomous driving vehicle operation system comprising:
    an operation server for an autonomous driving vehicle, the operation server being equipped with a memory unit that registers three-dimensional map data on roads, surrounding environment, and buildings having elevators, for making the autonomous driving vehicle connected to the operation server via a wireless network drive autonomously along a predetermined travelling route from current position to a destination based on the map data received from the operation server, wherein
    the autonomous driving vehicle comprises: a traveling unit; a drive unit; a control unit; a detection unit including an image-shooting unit, posture detection sensor, and position sensor; and a transmitting/receiving unit connected to the wireless network;
    the control unit of the autonomous driving vehicle recognizes the current position and surrounding environment based on detection signals from the detection unit, creates a traveling route from the current position to the destination by receiving map data of an area related to the move from the current position to the destination from the operation server, and controls the drive unit so as to drive the traveling unit along the traveling route;
    when the autonomous driving vehicle uses an elevator of a building along the traveling route, the control unit creates elevator usage information including boarding and exiting floors of the elevator and elevator control information including calling of an elevator cage on the boarding floor and designation of exiting floor;
    the elevator of the building has an elevator control unit connected to the operation server via the wireless network for controlling ascending/descending of the elevator cage based on the elevator usage information and the elevator control information from the autonomous driving vehicle;
    the control unit of the autonomous driving vehicle transmits the elevator usage information and the elevator control information to the elevator control unit via the wireless network; and
    the elevator cage has an elevator analysis sensor comprising:
    a camera or LiDAR capable of measuring distances; a computer for processing image signals obtained by the camera or the LiDAR; and a memory unit, wherein
    the passenger information pertaining to the users in the elevator cage obtained based on the image signals is output to the control unit of the autonomous driving vehicle via the elevator control unit and the operation server, wherein
    the control unit of the autonomous driving vehicle transmits the elevator usage information and the elevator control information based on the passenger information from the elevator analysis sensor, that the autonomous driving vehicle can move to and get in an elevator having sufficient space for the autonomous driving vehicle, to the elevator control unit and the operation server via the wireless network.

2. The autonomous driving vehicle operation system as set forth in claim 1, wherein the autonomous driving vehicle further comprises a voice output unit, and
    the control unit of the autonomous driving vehicle outputs a voice announcement informing of the traveling of the autonomous driving vehicle along the traveling route from the voice output unit of the autonomous driving vehicle according to the move along the traveling route, and also outputs a voice announcement concerning the use of the elevator from the voice output unit of the autonomous driving vehicle based on the elevator usage information.

3. The autonomous driving vehicle operation system as set forth in claim 1, wherein the operation server remotely monitors and/or remotely operates the operation of the autonomous driving vehicle based on mutual position between autonomous driving vehicles or between the autonomous driving vehicle and surrounding environment, etc. based on the current position and traveling route of the autonomous driving vehicle, and the elevator control unit is controlled by the operation server.

4. The autonomous driving vehicle operation system as set forth in claim 1, wherein the building is equipped with a control server for controlling the entire building, and
    the control server controls the elevator control unit based on the elevator usage information and the elevator control information as a result of being controlled by the server.

5. The autonomous driving vehicle operation system as set forth in claim 1, wherein the elevator control unit outputs a voice announcement from a voice output unit installed in the elevator cage, informing of the boarding of the autonomous driving vehicle from the boarding floor to the exiting floor, based on the elevator usage information, during the period from before boarding to exiting of the autonomous driving vehicle into/from the elevator.

6. The autonomous driving vehicle operation system as set forth in claim 1, wherein the elevator control unit comprises a voice output unit in an elevator hall on each floor of the elevator, and the elevator control unit outputs a voice announcement concerning the use of the elevator by the autonomous driving vehicle from the voice output unit in the elevator hall on the boarding or exiting floor based on the elevator usage information.

7. The autonomous driving vehicle operation system as set forth in claim 1, wherein the elevator cage has a display, and the elevator control unit provides images concerning the use of the elevator by the autonomous driving vehicle on the display based on the elevator usage information.

8. The autonomous driving vehicle operation system as set forth in claim 6, wherein a display is provided in proximity to the elevator hall, and
    the operation server and/or the elevator control unit output(s) images concerning the use of the elevator by the autonomous driving vehicle on the display, together with the voice output from the voice output unit in the elevator hall provided on the boarding or the exiting floor, based on the elevator usage information.

9. The autonomous driving vehicle operation system as set forth in claim 1, wherein the autonomous driving vehicle is a passenger vehicle for transporting users such as elderly people, sick and injured people, and physically challenged individuals, a working vehicle for performing various operations such as cleaning, disinfection and monitoring, or an autonomous delivery vehicle for delivering various goods such as food, drink, and commodities.

10. The autonomous driving vehicle operation system as set forth in claim 1, wherein the operation server further comprises an analysis unit for analyzing statistical elevator usage information transmitted from the elevator control unit, and a traveling route creation unit for creating a traveling route of the autonomous driving vehicle based on in-house probability information obtained by analyzing the statistical elevator usage information.

11. The autonomous driving vehicle operation system as set forth in claim 10, wherein the elevator cage comprises an elevator analysis sensor, and the analysis unit creates a traveling route of the autonomous driving vehicle based on the statistical elevator usage information and/or the passenger information output from the elevator analysis sensor.

12. The autonomous driving vehicle operation system as set forth in claim 1, wherein the operation server further comprises a control unit for controlling a plurality of the autonomous driving vehicles, a cooperation unit for establishing communication between the plurality of autonomous driving vehicles and a plurality of the elevators, an analysis unit, a traveling control unit for controlling the traveling of the plurality of autonomous driving vehicles, a remote monitoring unit and/or remote operating unit for remotely monitoring and/or remotely operating the plurality of autonomous driving vehicles, a database for connection, database for analysis, database for traveling control, and database for remote monitoring and/or remote operation stored in the memory unit, wherein
the control unit connects the plurality of autonomous driving vehicles to the plurality of elevators by the cooperation unit;
the traveling control unit creates elevator usage information pertaining to the plurality of elevators according to the schedule of the plurality of autonomous driving vehicles, and
the operating state of the plurality of autonomous driving vehicles and that of the plurality of elevators are remotely monitored and/or remotely operated by the remote monitoring unit and/or the remote operating unit.

13. An autonomous driving vehicle operation system comprising: an operation server for an autonomous driving vehicle, the operation server being equipped with a memory unit that registers three-dimensional map data on roads, surrounding environment, and buildings having elevators, for making the plurality of the autonomous driving vehicle connected to the operation server via a wireless network drive autonomously along a predetermined travelling route from current position to a destination based on the map data received from the operation server, wherein
each autonomous driving vehicle comprises: a traveling unit; a drive unit; a control unit; a detection unit including an image-shooting unit, posture detection sensor, and position sensor; and a transmitting/receiving unit connected to the wireless network;
the control unit of the autonomous driving vehicle recognizes the current position and surrounding environment based on detection signals from the detection unit, creates a traveling route from the current position to the destination by receiving map data of an area related to the move from the current position to the destination from the operation server, and controls the drive unit so as to drive the traveling unit along the traveling route;
when each autonomous driving vehicle uses an elevator of a building along the traveling route, the control unit creates elevator usage information including boarding and exiting floors of the elevator and elevator control information including calling of an elevator cage on the boarding floor and designation of exiting floor;
the elevator of the building has an elevator control unit connected to the operation server via the wireless network for controlling ascending/descending of the elevator cage based on the elevator usage information and the elevator control information from the autonomous driving vehicle;
the control unit of the autonomous driving vehicle transmits the elevator usage information and the elevator control information to the elevator control unit via the wireless network; and
the elevator cage has an elevator analysis sensor comprising:
a camera or LiDAR capable of measuring distances; a computer for processing image signals obtained by the camera or the LiDAR; and a memory unit, wherein
the passenger information pertaining to the users in the elevator cage obtained based on the image signals is output to the control unit of the autonomous driving vehicle via the elevator control unit and the operation server, wherein
the control unit of each autonomous driving vehicle transmits the elevator usage information and the elevator control information based on the passenger information from the elevator analysis sensor, that the autonomous driving vehicle can move to and get in an elevator having sufficient space for the autonomous driving vehicle, to the elevator control unit and the operation server via the wireless network.

14. The autonomous driving vehicle operation system as set forth in claim 13, wherein the operation server further comprises a control unit for controlling a plurality of the autonomous driving vehicles, a cooperation unit for establishing communication between the plurality of autonomous driving vehicles and a plurality of the elevators, an analysis unit, a traveling control unit for controlling the traveling of the plurality of autonomous driving vehicles, a remote monitoring unit and/or remote operating unit for remotely monitoring and/or remotely operating the plurality of autonomous driving vehicles, a database for connection, database for analysis, database for traveling control, and database for remote monitoring and/or remote operation stored in the memory unit, wherein
the control unit connects the plurality of autonomous driving vehicles to the plurality of elevators by the cooperation unit;
the traveling control unit creates elevator usage information pertaining to the plurality of elevators according to the schedule of the plurality of autonomous driving vehicles, and
the operating state of the plurality of autonomous driving vehicles and that of the plurality of elevators are remotely monitored and/or remotely operated by the remote monitoring unit and/or the remote operating unit.

15. The autonomous driving vehicle operation system as set forth in claim 13, wherein the building is equipped with a control server for controlling the entire building, and
the control server controls the elevator control unit based on the elevator usage information and the elevator control information as a result of being controlled by the server.

16. The autonomous driving vehicle operation system as set forth in claim 13, wherein the elevator control unit outputs a voice announcement from a voice output unit installed in the elevator cage, informing of the boarding of the autonomous driving vehicle from the boarding floor to the exiting floor, based on the elevator usage information, during the period from before boarding to exiting of the autonomous driving vehicle into/from the elevator.

17. The autonomous driving vehicle operation system as set forth in claim 13, wherein the autonomous driving vehicle is a passenger vehicle for transporting users such as elderly people, sick and injured people, and physically challenged individuals, a working vehicle for performing various operations such as cleaning, disinfection and monitoring, or an autonomous delivery vehicle for delivering various goods such as food, drink, and commodities.

18. The autonomous driving vehicle operation system as set forth in claim 13, wherein the operation server further comprises an analysis unit for analyzing statistical elevator usage information transmitted from the elevator control unit and a traveling route creation unit for creating a traveling route of the autonomous driving vehicle based on in-house probability information obtained by analyzing the statistical elevator usage information.

19. The autonomous driving vehicle operation system as set forth in claim 13, wherein the elevator cage comprises an elevator analysis sensor, and the analysis unit creates a traveling route of the autonomous driving vehicle based on the statistical elevator usage information and/or the passenger information output from the elevator analysis sensor.

* * * * *